(12) United States Patent
Ma et al.

(10) Patent No.: US 12,490,128 B2
(45) Date of Patent: Dec. 2, 2025

(54) MEASUREMENT OF REFERENCE SIGNAL WITH POLARIZATION

(71) Applicant: QUALCOMM Incorporated, San Diego, CA (US)

(72) Inventors: Liangping Ma, San Diego, CA (US); Peter Gaal, San Diego, CA (US); Xiao Feng Wang, San Diego, CA (US); Alberto Rico Alvarino, San Diego, CA (US); Ayan Sengupta, San Diego, CA (US); Bharat Shrestha, San Diego, CA (US); Jun Ma, San Diego, CA (US); Umesh Phuyal, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 18/678,188

(22) Filed: May 30, 2024

(65) Prior Publication Data
US 2024/0323722 A1    Sep. 26, 2024

Related U.S. Application Data

(62) Division of application No. 17/447,115, filed on Sep. 8, 2021, now Pat. No. 12,022,307.

(Continued)

(51) Int. Cl.
*H04W 24/08*    (2009.01)
*H04L 5/00*    (2006.01)

(52) U.S. Cl.
CPC .......... *H04W 24/08* (2013.01); *H04L 5/0048* (2013.01)

(58) Field of Classification Search
CPC ...... H04B 7/0404; H04B 17/12; H04B 17/24; H04B 17/104; H04B 17/309;
(Continued)

(56) References Cited

U.S. PATENT DOCUMENTS 9,660,779 B2    5/2017    Jing et al.
10,454,542 B2    10/2019    Wang et al.
(Continued)

FOREIGN PATENT DOCUMENTS

| WO | 2018084989 A1 | 5/2018 |
| WO | 2019014104 A1 | 1/2019 |
| WO | 2020068295 A1 | 4/2020 |

OTHER PUBLICATIONS

Huawei, et al., "Physical Layer Procedure for NR Positioning", 3GPP TSG RAN WG1 Meeting #98, 3GPP Draft, R1-1908117, 3rd Generation Partnership Project (3GPP), Mobile Competence Centre, 650, Route Des Lucioles, F-06921 Sophia-Antipolis Cedex, France, vol. RAN WG1, No. Prague, Czech Republic, Aug. 26, 2019-Aug. 30, 2019, Aug. 17, 2019 (Aug. 17, 2019), 14 Pages, XP051764737, Sections 1-2 and 3.1.1.

(Continued)

*Primary Examiner* — Michael Thier
*Assistant Examiner* — Prince A Mensah
(74) *Attorney, Agent, or Firm* — Harrity & Harrity, LLP

(57) ABSTRACT

Various aspects of the present disclosure generally relate to wireless communication. In some aspects, a user equipment (UE) may determine a duration of a first gap that precedes a reference signal, based at least in part on a polarization of the reference signal. The UE may determine a duration of a second gap that succeeds the reference signal, based at least in part on the polarization of the reference signal. The UE may perform a measurement of the reference signal based at least in part on the first gap and the second gap. Numerous other aspects are provided.

30 Claims, 20 Drawing Sheets

Related U.S. Application Data

(60) Provisional application No. 63/198,214, filed on Oct. 2, 2020.

(58) Field of Classification Search
CPC ... H04L 5/0023; H04L 5/0044; H04L 5/0048; H04W 24/02; H04W 24/08; H04W 36/00; H04W 36/16
See application file for complete search history.

(56) References Cited

U.S. PATENT DOCUMENTS

| | | | |
|---|---|---|---|
| 10,536,313 | B2 | 1/2020 | Abedini et al. |
| 2009/0252140 | A1 | 10/2009 | Imaeda |
| 2016/0277954 | A1* | 9/2016 | Frenne ................ H04W 72/541 |
| 2018/0234129 | A1* | 8/2018 | Chae ........................ H04B 7/10 |
| 2019/0373614 | A1 | 12/2019 | Yum et al. |
| 2020/0028654 | A1 | 1/2020 | Chen et al. |
| 2020/0404690 | A1 | 12/2020 | Lee et al. |
| 2021/0239783 | A1* | 8/2021 | Calcev ................. G01S 5/0215 |
| 2022/0110011 | A1 | 4/2022 | Ma et al. |
| 2022/0337379 | A1 | 10/2022 | Zhang et al. |
| 2022/0393754 | A1* | 12/2022 | Cao ...................... H04B 7/1555 |
| 2023/0027976 | A1* | 1/2023 | Park ..................... H04B 7/0408 |
| 2023/0056394 | A1* | 2/2023 | Priyanto ............... G01S 5/0218 |
| 2023/0064881 | A1 | 3/2023 | Liu et al. |
| 2023/0231297 | A1 | 7/2023 | Kim et al. |
| 2023/0231675 | A1* | 7/2023 | Xiong ................. H04L 27/2636 |

OTHER PUBLICATIONS

International Preliminary Report On Patentability—PCT/US2021/071406—The International Bureau of WIPO—Geneva, Switzerland—Apr. 13, 2023.
International Search Report and Written Opinion—PCT/US2021/071406—ISA/EPO—Feb. 25, 2022.
Partial International Search Report—PCT/US2021/071406—ISA/EPO—Jan. 4, 2022.

* cited by examiner

MEASUREMENT OF REFERENCE SIGNAL WITH POLARIZATION

CROSS-REFERENCE TO RELATED APPLICATION

This application is a divisional of Ser. No. 17/447,115, filed on Sep. 8, 2021, and entitled "MEASUREMENT OF REFERENCE SIGNAL WITH POLARIZATION," which claims priority to U.S. Provisional Patent Application No. 63/198,214, filed on Oct. 2, 2020, entitled "MEASUREMENT OF REFERENCE SIGNAL WITH POLARIZATION," the contents of which are incorporated herein by reference in their entireties.

FIELD OF THE DISCLOSURE

Aspects of the present disclosure generally relate to wireless communication and to techniques and apparatuses for measuring reference signals with polarization.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include a number of base stations (BSs) that can support communication for a number of user equipment (UEs). A UE may communicate with a BS via the downlink and uplink. "Downlink" or "forward link" refers to the communication link from the BS to the UE, and "uplink" or "reverse link" refers to the communication link from the UE to the BS. As will be described in more detail herein, a BS may be referred to as a Node B, a gNB, an access point (AP), a radio head, a transmit receive point (TRP), a New Radio (NR) BS, or a 5G Node B.

The above multiple access technologies have been adopted in various telecommunication standards to provide a common protocol that enables different user equipment to communicate on a municipal, national, regional, and even global level. NR, which may also be referred to as 5G, is a set of enhancements to the LTE mobile standard promulgated by the 3GPP. NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE, NR, and other radio access technologies.

SUMMARY

In some aspects, a user equipment (UE) for wireless communication includes a memory and one or more processors coupled to the memory, the one or more processors configured to determine a duration of a first gap that precedes a reference signal based at least in part on a polarization of the reference signal, determine a duration of a second gap that succeeds the reference signal based at least in part on the polarization of the reference signal, and perform a measurement of the reference signal based at least in part on the first gap and the second gap.

In some aspects, a UE for wireless communication includes a memory and one or more processors coupled to the memory, the one or more processors configured to receive configuration information indicating a polarization of a reference signal, receive the reference signal with the indicated polarization, and perform a measurement of the reference signal with the indicated polarization.

In some aspects, a non-terrestrial network (NTN) entity for wireless communication includes a memory and one or more processors coupled to the memory, the one or more processors configured to determine a polarization of a reference signal, transmit configuration information indicating the polarization of the reference signal, and transmit the reference signal with the polarization.

In some aspects, a UE for wireless communication includes a memory and one or more processors coupled to the memory, the one or more processors configured to transmit capability information indicating a capability for switching a polarization of one or more antennas and receive an instruction to switch the polarization of the one or more antennas.

In some aspects, an NTN entity for wireless communication includes a memory and one or more processors coupled to the memory, the one or more processors configured to receive, from a UE, capability information indicating a capability for switching a polarization of one or more antennas and transmit an instruction to switch the polarization of the one or more antennas based at least in part on the capability information.

In some aspects, a method of wireless communication performed by a UE includes determining a duration of a first gap that precedes a reference signal based at least in part on a polarization of the reference signal, determining a duration of a second gap that succeeds the reference signal based at least in part on the polarization of the reference signal, and performing a measurement of the reference signal based at least in part on the first gap and the second gap.

In some aspects, a method of wireless communication performed by a UE includes receiving configuration information indicating a polarization of a reference signal, receiving the reference signal with the indicated polarization, and performing a measurement of the reference signal with the indicated polarization.

In some aspects, a method of wireless communication performed by an NTN entity includes determining a polarization of a reference signal, transmitting configuration information indicating the polarization of the reference signal, and transmitting the reference signal with the polarization.

In some aspects, a method of wireless communication performed by a UE includes transmitting capability information indicating a capability for switching a polarization of one or more antennas and receiving an instruction to switch the polarization of the one or more antennas.

In some aspects, a method of wireless communication performed by an NTN entity includes receiving, from a UE, capability information indicating a capability for switching a polarization of one or more antennas and transmitting an instruction to switch the polarization of the one or more antennas based at least in part on the capability information.

In some aspects, a non-transitory computer-readable medium storing a set of instructions for wireless communication includes one or more instructions that, when executed by one or more processors of a UE, cause the UE to determine a duration of a first gap that precedes a reference signal based at least in part on a polarization of the reference signal, determine a duration of a second gap that succeeds the reference signal based at least in part on the polarization of the reference signal, and perform a measurement of the reference signal based at least in part on the first gap and the second gap.

In some aspects, a non-transitory computer-readable medium storing a set of instructions for wireless communication includes one or more instructions that, when executed by one or more processors of a UE, cause the UE to receive configuration information indicating a polarization of a reference signal, receive the reference signal with the indicated polarization, and perform a measurement of the reference signal with the indicated polarization.

In some aspects, a non-transitory computer-readable medium storing a set of instructions for wireless communication includes one or more instructions that, when executed by one or more processors of an NTN entity, cause the NTN entity to determine a polarization of a reference signal, transmit configuration information indicating the polarization of the reference signal, and transmit the reference signal with the polarization.

In some aspects, a non-transitory computer-readable medium storing a set of instructions for wireless communication includes one or more instructions that, when executed by one or more processors of a UE, cause the UE to transmit capability information indicating a capability for switching a polarization of one or more antennas and receive an instruction to switch the polarization of the one or more antennas.

In some aspects, a non-transitory computer-readable medium storing a set of instructions for wireless communication includes one or more instructions that, when executed by one or more processors of a base station, cause the base station to receive, from a UE, capability information indicating a capability for switching a polarization of one or more antennas and transmit an instruction to switch the polarization of the one or more antennas based at least in part on the capability information.

In some aspects, an apparatus for wireless communication includes means for determining a duration of a first gap that precedes a reference signal based at least in part on a polarization of the reference signal, means for determining a duration of a second gap that succeeds the reference signal based at least in part on the polarization of the reference signal and means for performing a measurement of the reference signal based at least in part on the first gap and the second gap.

In some aspects, an apparatus for wireless communication includes means for receiving configuration information indicating a polarization of a reference signal, means for receiving the reference signal with the indicated polarization and means for performing a measurement of the reference signal with the indicated polarization.

In some aspects, an apparatus for wireless communication includes means for determining a polarization of a reference signal, means for transmitting configuration information indicating the polarization of the reference signal, and means for transmitting the reference signal with the polarization.

In some aspects, an apparatus for wireless communication includes means for transmitting capability information indicating a capability for switching a polarization of one or more antennas and means for receiving an instruction to switch the polarization of the one or more antennas.

In some aspects, an apparatus for wireless communication includes means for receiving, from a UE, capability information indicating a capability for switching a polarization of one or more antennas and means for transmitting an instruction to switch the polarization of the one or more antennas based at least in part on the capability information.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with a 5G or NR radio access technology (RAT), aspects of the present disclosure can be applied to other RATs, such as a 3G RAT, a 4G RAT, and/or a RAT subsequent to 5G (e.g., 6G).

Figure 1:
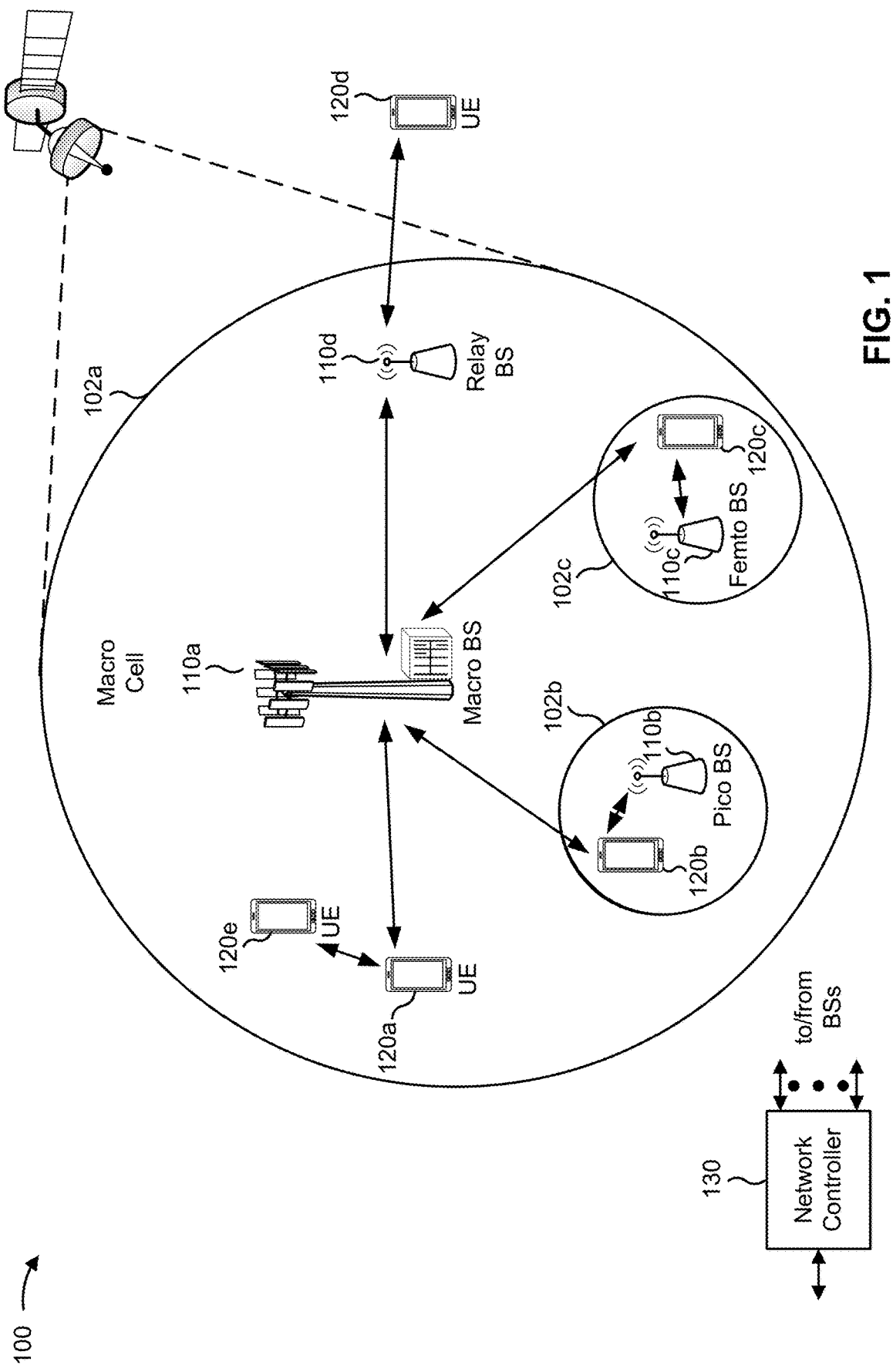
FIG. 1 is a diagram illustrating an example of a wireless network, in accordance with the present disclosure.

FIG. 1 is a diagram illustrating an example of a wireless network 100 in accordance with the present disclosure. The wireless network 100 may be or may include elements of a 5G (NR) network and/or an LTE network, among other examples. The wireless network 100 may include a number of base stations 110 (shown as BS 110a, BS 110b, BS 110c, and BS 110d) and other network entities. A base station (BS) is an entity that communicates with user equipment (UEs) and may also be referred to as an NR BS, a Node B, a gNB, a 5G node B (NB), an access point, or a transmit receive point (TRP). Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces such as a direct physical connection, or a virtual network using any suitable transport network.

In some aspects, as shown, a cell may be provided by a base station 110 of a non-terrestrial network. As used herein, "non-terrestrial network" may refer to a network for which access is provided by a non-terrestrial base station, such as a base station carried by a satellite, a balloon, a dirigible, an airplane, an unmanned aerial vehicle, a high altitude platform station, and/or the like.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG.

1, a relay BS 110*d* may communicate with macro BS 110*a* and a UE 120*d* in order to facilitate communication between BS 110*a* and UE 120*d*. A relay BS may also be referred to as a relay station, a relay base station, a relay, and/or the like. In some aspects, a relay station may be implemented using a non-terrestrial platform, similarly to the base station described above.

Wireless network 100 may be a heterogeneous network that includes BSs of different types, such as macro BSs, pico BSs, femto BSs, and/or relay BSs. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, directly or indirectly, via a wireless or wireline backhaul.

UEs 120 (e.g., 120*a*, 120*b*, 120*c*) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, and/or location tags that may communicate with a non-terrestrial network entity, a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment. UE 120 may be included inside a housing that houses components of UE 120, such as processor components and/or memory components. In some aspects, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks may be deployed in a given geographic area. Each wireless network may support a particular RAT and may operate on one or more frequencies. A RAT may also be referred to as a radio technology, and/or an air interface. A frequency may also be referred to as a carrier, and/or a frequency channel. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120*a* and UE 120*c*) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, or a vehicle-to-infrastructure (V2I) protocol), and/or a mesh network. In this case, the UE 120 may perform scheduling operations, resource selection operations, and/or other operations described elsewhere herein as being performed by the base station 110.

Devices of wireless network 100 may communicate using the electromagnetic spectrum, which may be subdivided based on frequency or wavelength into various classes, bands, channels, or the like. For example, devices of wireless network 100 may communicate using an operating band having a first frequency range (FR1), which may span from 410 MHz to 7.125 GHZ, and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHZ, FR1 is often referred to as a "sub-6 GHz" band. Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHZ, frequencies within FR1, and/or mid-band frequencies (e.g., greater than 7.125 GHZ). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHZ). It is contemplated that the frequencies included in FR1 and FR2 may be modified, and techniques described herein are applicable to those modified frequency ranges.

As indicated above, FIG. 1 is provided as an example. Other examples may differ from what is described with regard to FIG. 1.

Figure 2:
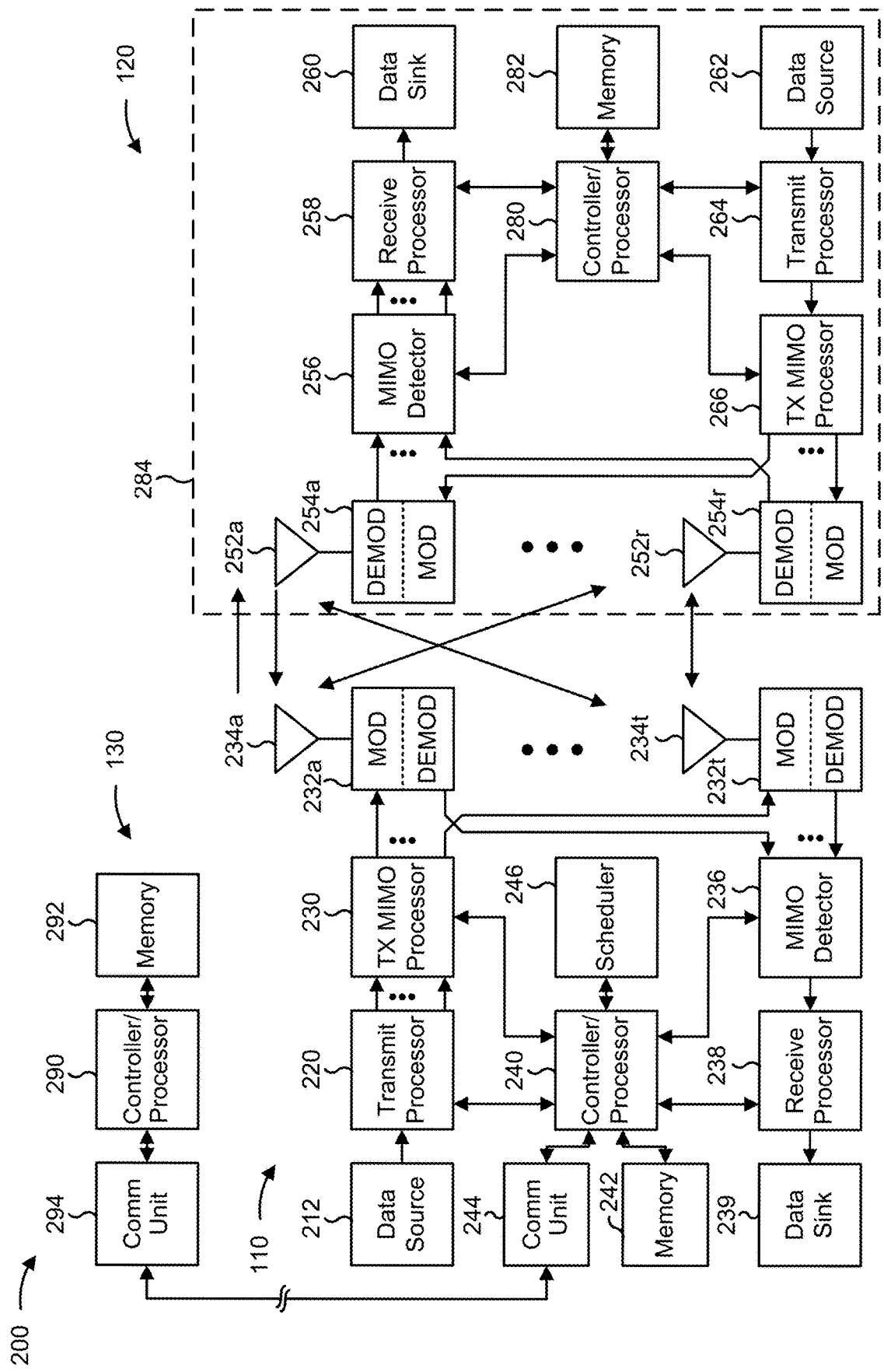
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. Base station 110 may be equipped with T antennas 234*a* through 234*t*, and UE 120 may be equipped with R antennas 252*a* through 252*r*, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI)) and control information (e.g., CQI requests, grants, upper layer signaling) and provide overhead symbols and control symbols. Transmit processor 220 may also generate reference symbols for reference signals (e.g., a cell-specific reference signal (CRS), a demodulation reference signal (DMRS)) and synchronization signals (e.g., the primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232*a* through 232*t*. Each modulator 232 may process a respective output symbol stream (e.g., for OFDM) to obtain an output sample stream. Each modulator 232 may further process (e.g., convert to analog, amplify, filter, and upconvert) the output sample stream to obtain a downlink signal. T downlink signals from modulators 232*a* through 232*t* may be transmitted via T antennas 234*a* through 234*t*, respectively.

At UE 120, antennas 252*a* through 252*r* may receive the downlink signals from base station 110 and/or other base stations and may provide received signals to demodulators (DEMODs) 254*a* through 254*r*, respectively. Each demodulator 254 may condition (e.g., filter, amplify, downconvert, and digitize) a received signal to obtain input samples. Each demodulator 254 may further process the input samples (e.g., for OFDM) to obtain received symbols. A MIMO detector 256 may obtain received symbols from all R demodulators 254*a* through 254*r*, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. The term "controller/processor" may refer to one or more controllers, one or more processors, or a combination thereof. A channel processor may determine reference signal received power (RSRP), received signal strength indicator (RSSI), reference signal received quality (RSRQ), and/or CQI, among other examples. In some aspects, one or more components of UE 120 may be included in a housing 284.

Network controller 130 may include communication unit 294, controller/processor 290, and memory 292. Network controller 130 may include, for example, one or more devices in a core network. Network controller 130 may communicate with base station 110 via communication unit 294.

Antennas (e.g., antennas 234*a* through 234*t* and/or antennas 252*a* through 252*r*) may include, or may be included within, one or more antenna panels, antenna groups, sets of antenna elements, and/or antenna arrays, among other examples. An antenna panel, an antenna group, a set of antenna elements, and/or an antenna array may include one or more antenna elements. An antenna panel, an antenna group, a set of antenna elements, and/or an antenna array may include a set of coplanar antenna elements and/or a set of non-coplanar antenna elements. An antenna panel, an antenna group, a set of antenna elements, and/or an antenna array may include antenna elements within a single housing and/or antenna elements within multiple housings. An antenna panel, an antenna group, a set of antenna elements, and/or an antenna array may include one or more antenna elements coupled to one or more transmission and/or reception components, such as one or more components of FIG. 2.

On the uplink, at UE 120, a transmit processor 264 may receive and process data from a data source 262 and control information (e.g., for reports that include RSRP, RSSI, RSRQ, and/or CQI) from controller/processor 280. Transmit processor 264 may also generate reference symbols for one or more reference signals. The symbols from transmit processor 264 may be precoded by a TX MIMO processor 266 if applicable, further processed by modulators 254*a* through 254*r* (e.g., for DFT-s-OFDM, CP-OFDM), and transmitted to base station 110. In some aspects, a modulator and a demodulator (e.g., MOD/DEMOD 254) of the UE 120 may be included in a modem of the UE 120. In some aspects, the UE 120 includes a transceiver. The transceiver may include any combination of antenna(s) 252, modulators and/or demodulators 254, MIMO detector 256, receive processor 258, transmit processor 264, and/or TX MIMO processor 266. The transceiver may be used by a processor (e.g., controller/processor 280) and memory 282 to perform aspects of any of the methods described herein (for example, as described with reference to FIGS. 5-20).

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Base station 110 may include a scheduler 246 to schedule UEs 120 for downlink and/or uplink communications. In some aspects, a modulator and a demodulator (e.g., MOD/DEMOD 232) of the base station 110 may be included in a modem of the base station 110. In some aspects, the base station 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/processor 240) and memory 242 to perform aspects of any of the methods described herein (for example, as described with reference to FIGS. 5-20).

Controller/processor 240 of base station 110, controller/processor 280 of UE 120, and/or any other component(s) of FIG. 2 may perform one or more techniques associated with measuring reference signals with polarization, as described in more detail elsewhere herein. For example, a controller/processor of a non-terrestrial network (NTN) entity (e.g., controller/processor 240 of base station 110), controller/processor 280 of UE 120, and/or any other component(s) of FIG. 2 may perform or direct operations of, for example, process 1100 of FIG. 11, process 1200 of FIG. 12, process 1300 of FIG. 13, process 1400 of FIG. 14, process 1500 of FIG. 15, and/or other processes as described herein. Memories 242 and 282 may store data and program codes for base station 110 and UE 120, respectively. In some aspects, memory 242 and/or memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of base station 110 and/or UE 120, may cause the one or more processors, UE 120, an NTN entity, and/or base station 110 to perform or direct operations of, for example, process 1100 of FIG. 11, process 1200 of FIG. 12, process 1300 of FIG. 13, process 1400 of FIG. 14, process 1500 of FIG. 15, and/or other processes as described herein. In some aspects, executing instructions may include running the instructions, converting the instructions, compiling the instructions, and/or interpreting the instructions, among other examples.

In some aspects, a UE 120 includes means for determining a duration of a first gap that precedes a reference signal based at least in part on a polarization of the reference signal, means for determining a duration of a second gap that succeeds the reference signal based at least in part on the polarization of the reference signal, and/or means for performing a measurement of the reference signal based at least in part on the first gap and the second gap. The means for UE 120 to perform operations described herein may include, for example, antenna 252, demodulator 254, MIMO detector 256, receive processor 258, transmit processor 264, TX MIMO processor 266, modulator 254, controller/processor 280, and/or memory 282.

In some aspects, a UE 120 includes means for receiving configuration information indicating a polarization of a reference signal, means for receiving the reference signal with the indicated polarization, and/or means for performing a measurement of the reference signal with the indicated polarization. The means for UE 120 to perform operations described herein may include, for example, antenna 252, demodulator 254, MIMO detector 256, receive processor 258, transmit processor 264, TX MIMO processor 266, modulator 254, controller/processor 280, and/or memory 282.

In some aspects, an NTN entity includes means for determining a polarization of a reference signal, means for transmitting configuration information indicating the polarization of the reference signal and/or means for transmitting the reference signal with the polarization. The means for the NTN entity to perform operations described herein may include, for example, transmit processor 220, TX MIMO processor 230, modulator 232, antenna 234, demodulator 232, MIMO detector 236, receive processor 238, controller/processor 240, memory 242, and/or scheduler 246.

In some aspects, a UE 120 includes means for transmitting capability information indicating a capability for switching a polarization of one or more antennas and/or means for receiving an instruction to switch the polarization of the one or more antennas. The means for UE 120 to perform operations described herein may include, for example, antenna 252, demodulator 254, MIMO detector 256, receive processor 258, transmit processor 264, TX MIMO processor 266, modulator 254, controller/processor 280, and/or memory 282.

In some aspects, an NTN entity includes means for receiving, from a UE, capability information indicating a capability for switching a polarization of one or more antennas and/or means for transmitting an instruction to switch the polarization of the one or more antennas based at least in part on the capability information. The means for the NTN entity to perform operations described herein may include, for example, transmit processor 220, TX MIMO processor 230, modulator 232, antenna 234, demodulator 232, MIMO detector 236, receive processor 238, controller/processor 240, memory 242, and/or scheduler 246.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of controller/processor 280.

As indicated above, FIG. 2 is provided as an example. Other examples may differ from what is described with regard to FIG. 2.

Figure 3:
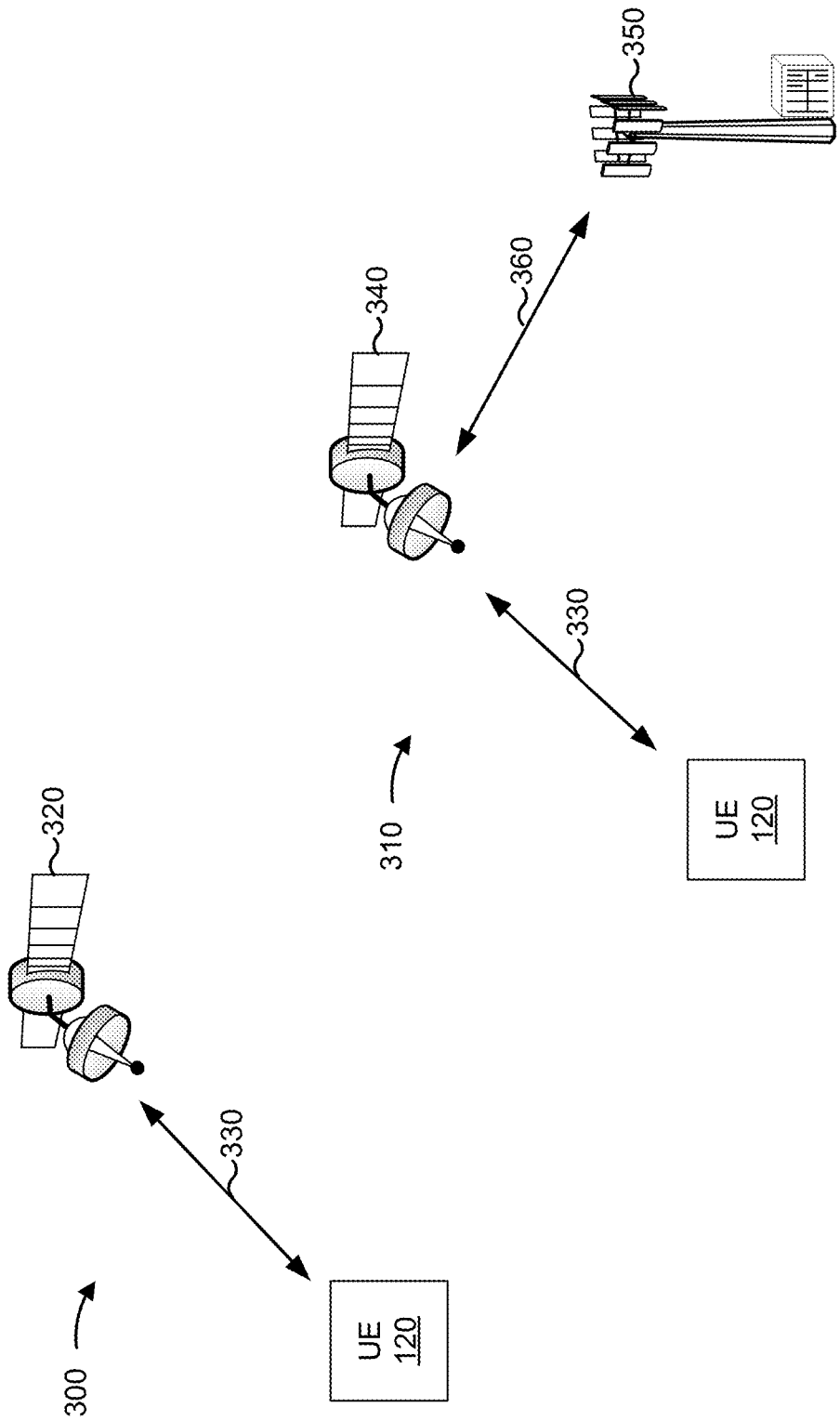
FIG. 3 is a diagram illustrating an example of a regenerative satellite deployment and an example of a transparent satellite deployment in a non-terrestrial network (NTN), in accordance with the present disclosure.

FIG. 3 is a diagram illustrating an example 300 of a regenerative satellite deployment and an example 310 of a transparent satellite deployment in an NTN, in accordance with the present disclosure.

Example 300 shows a regenerative satellite deployment. In example 300, a UE 120 is served by a satellite 320 via a service link 330. For example, the satellite 320 may include a BS 110 (e.g., BS 110*a*), and/or a gNB. In some aspects, the satellite 320 may be referred to as a non-terrestrial base station, a regenerative repeater, an on-board processing repeater, and/or an NTN entity. In some aspects, the satellite 320 may demodulate an uplink radio frequency signal and may modulate a baseband signal derived from the uplink radio signal to produce a downlink radio frequency transmission. The satellite 320 may transmit the downlink radio frequency signal on the service link 330. The satellite 320 may provide a cell that covers the UE 120.

Example 310 shows a transparent satellite deployment, which may also be referred to as a bent-pipe satellite deployment. In example 310, a UE 120 is served by a satellite 340 via the service link 330. Satellite 340 may also be considered to be an NTN entity. The satellite 340 may be a transparent satellite. The satellite 340 may relay a signal received from gateway 350 via a feeder link 360. For example, the satellite may receive an uplink radio frequency transmission and may transmit a downlink radio frequency transmission without demodulating the uplink radio frequency transmission. In some aspects, the satellite may frequency convert the uplink radio frequency transmission received on the service link 330 to a frequency of the uplink radio frequency transmission on the feeder link 360 and may amplify and/or filter the uplink radio frequency transmission. In some aspects, the UEs 120 shown in example 300 and example 310 may be associated with a Global Navigation Satellite System (GNSS) capability and/or a Global Positioning System (GPS) capability, though not all UEs have such capabilities. The satellite 340 may provide a cell that covers the UE 120.

The service link 330 may include a link between the satellite 340 and the UE 120, and may include one or more of an uplink or a downlink. The feeder link 360 may include a link between the satellite 340 and the gateway 350, and may include one or more of an uplink (e.g., from the UE 120 to the gateway 350) or a downlink (e.g., from the gateway 350 to the UE 120).

The feeder link 360 and the service link 330 may each experience Doppler effects due to the movement of the satellites 320 and 340, and potentially movement of a UE 120. These Doppler effects may be significantly larger than in a terrestrial network. The Doppler effect on the feeder link 360 may be compensated for to some degree, but may still be associated with some amount of uncompensated frequency error. Furthermore, the gateway 350 may be associated with a residual frequency error, and/or the satellite 320/340 may be associated with an on-board frequency error. These sources of frequency error may cause a received downlink frequency at the UE 120 to drift from a target downlink frequency.

As indicated above, FIG. 3 is provided as an example. Other examples may differ from what is described with regard to FIG. 3.

Figure 4:
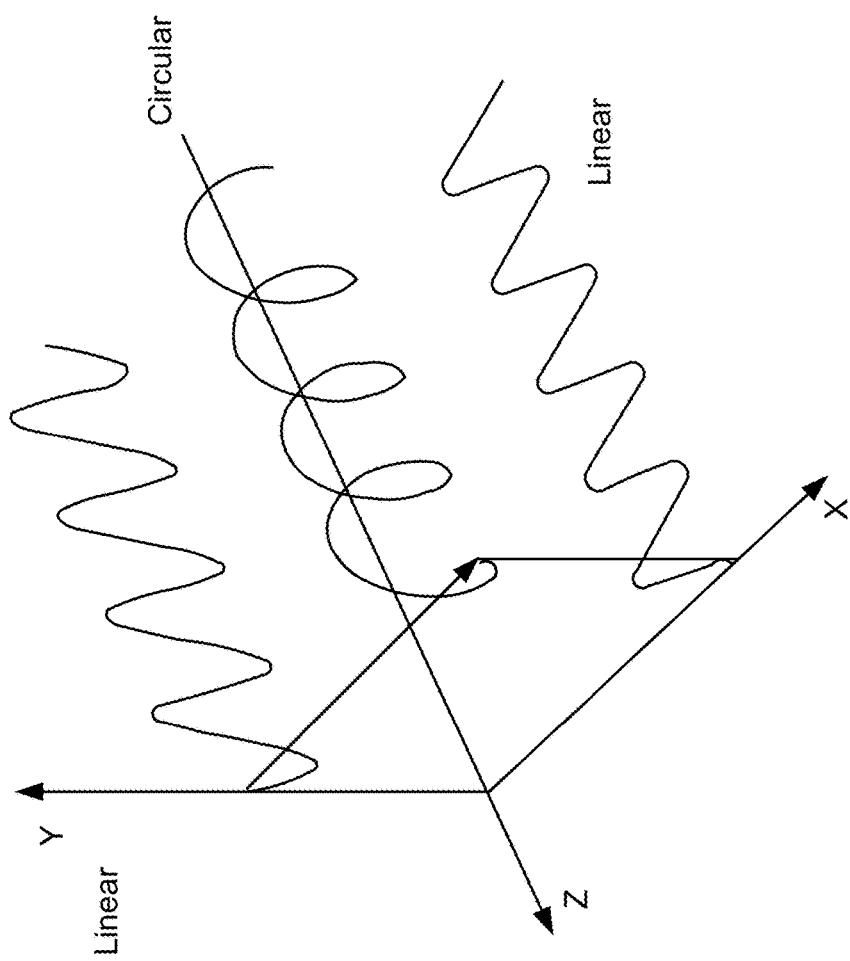
FIG. 4 is a diagram illustrating an example of linear polarization and circular polarization, in accordance with the present disclosure.

FIG. 4 is a diagram illustrating an example 400 of linear polarization and circular polarization, in accordance with the present disclosure.

An NTN entity may transmit and receive with beams that have a polarization. Linear polarization occurs when the tip of the electric field of an electromagnetic wave at a fixed point in space oscillates along a straight line over time. Circular polarization occurs when the tip of the electric field of an electromagnetic wave at a fixed point in space traces a circle, and the electromagnetic wave may be formed by superposing two orthogonal linearly polarized waves of equal amplitude and a 90-degree phase difference. A circular polarization may be a right hand circular polarization (RHCP) or a left hand circular polarization (LHCP).

"Transmit polarization" may refer to a polarization associated with a transmission from an NTN entity or a UE, and "receive polarization" may refer to a polarization associated with a reception at the NTN entity or the UE. In some cases, the transmit polarization may be the same as the receive polarization. However, in other cases, the transmit polarization may be different than the receive polarization, which may result in a polarization mismatch loss. For example, when the transmit polarization is RHCP and the receive polarization is LHCP, the polarization mismatch loss may be greater than 20 decibels (dB). When the transmit polarization is a circular polarization and the receive polarization is a linear polarization, or vice versa, the polarization mismatch loss may be about 3 dB. When the transmit polarization is a horizontal linear polarization and the receive polarization is a vertical linear polarization, the polarization mismatch loss may be greater than 20 dB.

Portable devices, such as UEs, may have varying polarization due to movement. Further, linear polarization (e.g., horizontal linear polarization or vertical linear polarization) may be less reliable than circular polarization for portable devices with respect to frequency reuse. Frequency reuse may occur when a specified range of frequencies are used more than once in a same radio system so that a total capacity of the radio system is increased without increasing an allocated bandwidth of the radio system.

A UE having a polarization capability may be able to detect a polarization and/or transmit signals with the polarization. For example, a UE capable of two circular polarization modes may be able to detect a circular polarization associated with one of the two circular polarization modes (with high accuracy). A UE with two linearly cross-polarized antennas may detect and transmit signals using both circular polarizations. Polarization detection may increase processing at the UE and a polarization may be signaled to the UE. A signaled polarization may be accurate for a direct line of sight (LOS) communication. However, a non-LOS communication may be a reflected communication, and a reflected communication may have a different polarization than a direct LOS communication. For example, an RHCP polarization of a downlink communication may become an LHCP polarization after being reflected off of a surface. That is, a best receive polarization for a downlink communication may be different than a polarization at the point of transmission. As for uplink communications, a UE may determine a best transmit polarization to correspond to a best receive polarization assuming downlink and uplink reciprocity (e.g., the uplink and the downlink are relatively close in frequency). However, the receive polarization may be different due to signal reflection. If a polarization is different than expected, there may be a polarization mismatch loss.

As indicated above, FIG. 4 is provided as an example. Other examples may differ from what is described with regard to FIG. 4.

Figure 5:
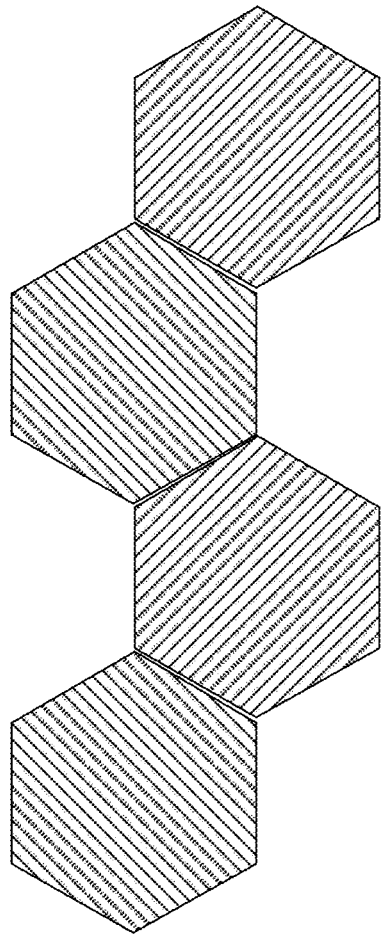
FIG. 5 is a diagram illustrating examples of coverage areas served by one or more polarizations, in accordance with the present disclosure.
Figure 5:
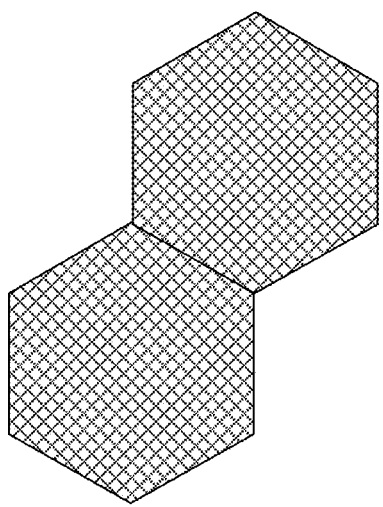

FIG. 5 is a diagram illustrating examples 500 and 502 of coverage areas served by one or more polarizations, in accordance with the present disclosure.

FIG. 5 shows coverage areas or cells provided by an NTN entity, such as a non-terrestrial base station or a non-terrestrial relay station. The NTN entity may generate multiple beams associated with respective frequency regions. In some aspects, a beam may be an analog beam (e.g., generated by a cone antenna or a different type of antenna). In some aspects, the beam may be a digital beam, which may be formed by signal manipulation across an antenna array.

As shown by reference number 500, a coverage area may be served by one polarization to increase a system capacity. One polarization for the coverage area may be beneficial when the coverage area is associated with a sparse constellation of UEs, where the UEs are able to dynamically adjust a polarization. The polarization may be a circular polarization, such as an RHCP or an LHCP, or the polarization may be a linear polarization, such as a vertical linear polarization or a horizontal linear polarization.

As shown by reference number 502, a coverage area may be served by two polarizations to increase a system capacity. The two polarizations may be associated with a same frequency, or the two polarizations may be associated with different frequencies. Two polarizations for the coverage area may be beneficial when the coverage area is associated with a dense constellation of UEs. The two polarizations may be circular polarizations, or the two polarizations may be linear polarizations.

As indicated above, FIG. 5 provides some examples. Other examples may differ from what is described with regard to FIG. 5.

A downlink channel may include a physical downlink control channel (PDCCH) that carries downlink control information (DCI), a physical downlink shared channel (PDSCH) that carries downlink data, or a physical broadcast channel (PBCH) that carries system information, among other examples. In some aspects, PDSCH communications may be scheduled by PDCCH communications. An uplink channel may include a physical uplink control channel (PUCCH) that carries uplink control information (UCI), a physical uplink shared channel (PUSCH) that carries uplink data, or a physical random access channel (PRACH) used for initial network access, among other examples. In some aspects, a UE may transmit acknowledgement (ACK) or negative acknowledgement (NACK) feedback (e.g., ACK/NACK feedback or ACK/NACK information) in UCI on the PUCCH and/or the PUSCH.

A downlink reference signal may include a synchronization signal block (SSB), a channel state information (CSI) reference signal (CSI-RS), a DMRS, a positioning reference signal (PRS), or a phase tracking reference signal (PTRS), among other examples. An uplink reference signal may include a sounding reference signal (SRS), a DMRS, or a PTRS, among other examples.

An SSB may carry information used for initial network acquisition and synchronization, such as a PSS, an SSS, a PBCH, and a PBCH DMRS. An SSB is sometimes referred to as a synchronization signal/PBCH (SS/PBCH) block. In some aspects, an NTN entity (e.g., base station, relay station) may transmit multiple SSBs on multiple corresponding beams, and the SSBs may be used for beam selection.

A CSI-RS may carry information used for downlink channel estimation (e.g., downlink CSI acquisition), which may be used for scheduling, link adaptation, or beam management, among other examples. The NTN entity may configure a set of CSI-RSs for the UE, and the UE may measure the configured set of CSI-RSs. Based at least in part on the measurements, the UE may perform channel estimation and may report channel estimation parameters to the NTN entity (e.g., in a CSI report), such as a CQI, a precoding matrix indicator (PMI), a CSI-RS resource indicator (CRI), a layer indicator (LI), a rank indicator (RI), or an RSRP, among other examples. The NTN entity or a base station may use the CSI report to select transmission parameters for downlink communications to the UE, such as a number of transmission layers (e.g., a rank), a precoding matrix (e.g., a precoder), a MCS, or a refined downlink beam (e.g., using a beam refinement procedure or a beam management procedure), among other examples.

A DMRS may carry information used to estimate a radio channel for demodulation of an associated physical channel (e.g., PDCCH, PDSCH, PBCH, PUCCH, or PUSCH). The design and mapping of a DMRS may be specific to a physical channel for which the DMRS is used for estimation. DMRSs are UE-specific, can be beamformed, can be confined in a scheduled resource (e.g., rather than transmitted on a wideband), and can be transmitted only when necessary. As shown, DMRSs are used for both downlink communications and uplink communications.

A PTRS may carry information used to compensate for oscillator phase noise. Typically, the phase noise increases as the oscillator carrier frequency increases. Thus, a PTRS can be utilized at high carrier frequencies, such as millimeter wave frequencies, to mitigate phase noise. The PTRS may be used to track the phase of the local oscillator and to enable suppression of phase noise and common phase error (CPE). PTRSs are used for both downlink communications (e.g., on the PDSCH) and uplink communications (e.g., on the PUSCH).

A PRS may carry information used to enable timing or ranging measurements of the UE based on signals transmitted by the non-terrestrial network entity to improve observed time difference of arrival (OTDOA) positioning performance. For example, a PRS may be a pseudo-random Quadrature Phase Shift Keying (QPSK) sequence mapped in diagonal patterns with shifts in frequency and time to avoid collision with cell-specific reference signals and control channels (e.g., a PDCCH). In general, a PRS may be designed to improve detectability by the UE 120, which may need to detect downlink signals from multiple neighboring NTN entities in order to perform OTDOA-based positioning. Accordingly, the UE may receive a PRS from multiple cells (e.g., a reference cell and one or more neighbor cells), and may report a reference signal time difference (RSTD) based on OTDOA measurements associated with the PRSs received from the multiple cells. In some aspects, the NTN entity may then calculate a position of the UE based on the RSTD measurements reported by the UE.

An SRS may carry information used for uplink channel estimation, which may be used for scheduling, link adaptation, precoder selection, or beam management, among other examples. The NTN entity may configure one or more SRS resource sets for the UE, and the UE may transmit SRSs on the configured SRS resource sets. An SRS resource set may have a configured usage, such as uplink CSI acquisition, downlink CSI acquisition for reciprocity-based operations, or uplink beam management, among other examples. The NTN entity may measure the SRSs, may perform channel estimation based at least in part on the measurements, and may use the SRS measurements to configure communications with the UE.

Figure 6:
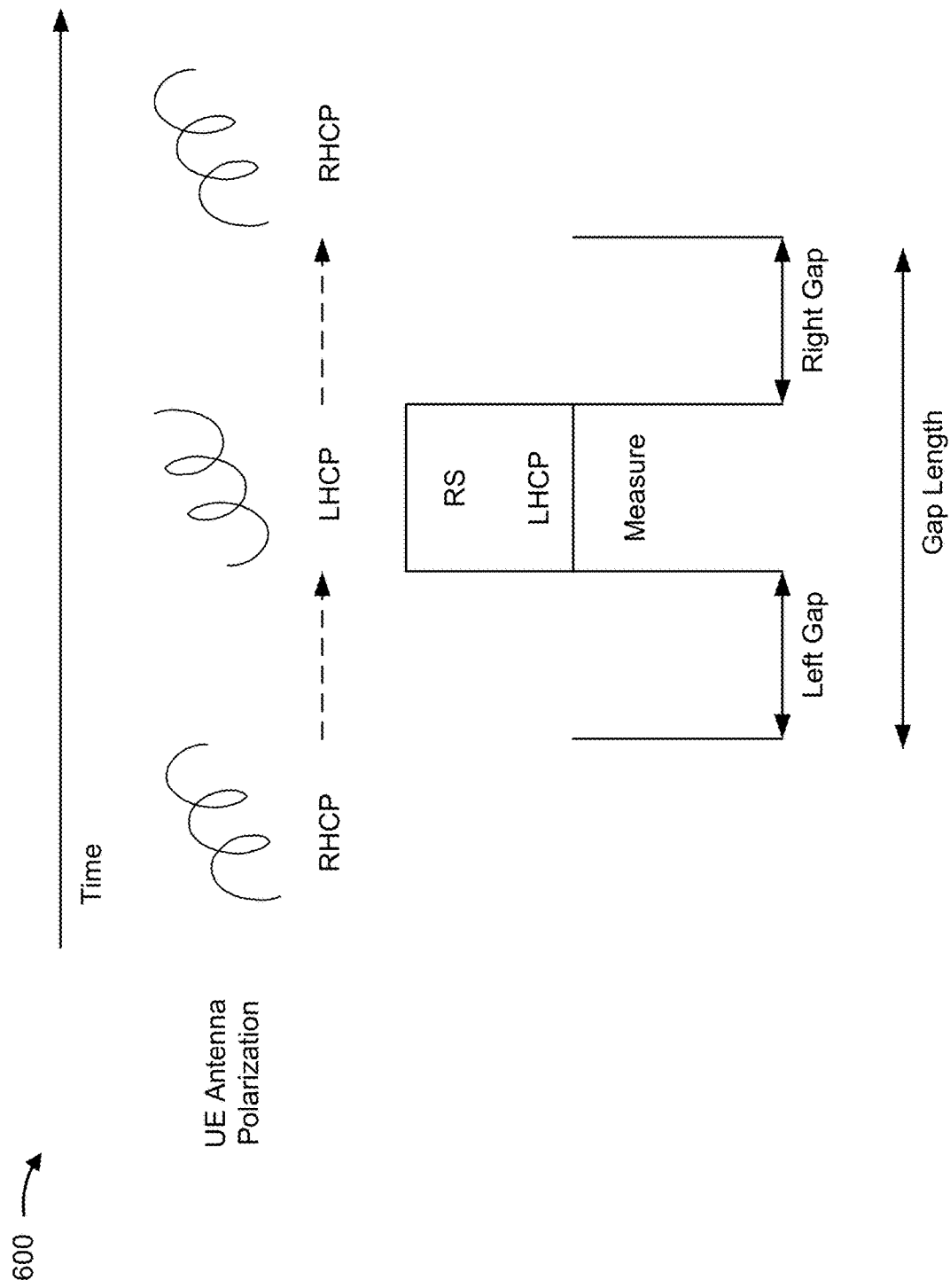
FIG. 6 is a diagram illustrating an example of measurement gaps for switching polarization, in accordance with the present disclosure.

FIG. 6 is a diagram illustrating an example 600 of measurement gaps for switching polarization, in accordance with the present disclosure.

An NTN entity may transmit a reference signal with a polarization. However, an antenna configuration of the UE may not be arranged for the same polarization as the reference signal. This may result in a polarization mismatch loss that causes a measurement of the reference signal to be inaccurate or to fail. Inaccurate measurements can degrade communications or cause retransmissions that would be a waste of power, processing resources, and signaling resources.

According to various aspects described herein, a UE may determine a first measurement gap that precedes a reference signal, or a scheduled time for the reference signal. The first measurement gap may be referred to as a "left gap" as the left gap is to the left of (i.e., precedes) the reference signal in time, as shown by example 600. The UE may determine a duration of the left gap based at least in part on a polarization of the reference signal and a polarization of an antenna configuration of the UE prior to the left gap. The duration of the left gap may be longer or shorter based at least in part on an expected time for the UE to switch to the polarization of the reference signal from a different polarization. Some polarization switches may take longer than others, depending on a direction or type of polarization switch (e.g., RHCP to LHCP, RHCP to linear, horizontal linear to vertical linear), or a difference between polarizations. In some aspects, the UE may determine a duration of the left gap based at least in part on whether the reference signal is beamformed (e.g., in an analog beam) in a same way as a transmit beam that the UE is currently receiving.

The UE may also determine a second measurement gap that succeeds the reference signal. The second measurement gap may be referred to as a "right gap" because the right gap is to the right of (i.e., succeeds) the reference signal in time, as shown by example 600. A duration of the right gap may be longer or shorter based at least in part on an expected time for the UE to revert from the polarization of the reference signal to the polarization of the UE antennas prior to the left gap. A total gap length may include a time for the left gap, a time for the reference signal, and a time for the right gap. In some aspects, an NTN entity or a base station may configure durations for the measurement gaps for one or more reference signals.

The UE may use the left gap to switch polarization from an original (different) polarization to the polarization of the reference signal, measure the reference signal with an antenna configuration that matches the polarization of the reference signal, and use the right gap to switch back to the original, different polarization. As a result, the UE may obtain and report a more accurate measurement of the reference signal, without a polarization mismatch loss. An NTN entity or a base station may use the more accurate measurement for scheduling future UE communications. The UE does not suffer degraded communications due to a polarization mismatch, and the UE conserves power, processing resources, and signaling resources that would otherwise be consumed by degraded communications, and/or retransmissions. The UE may perform layer 1 (L1) or layer 3 (L3) measurements. The measurement gap may be also referred to as a "time gap" to signify that the gap is not necessarily limited to only L3 measurements.

As indicated above, FIG. 6 is provided as an example. Other examples may differ from what is described with regard to FIG. 6.

Figure 7:
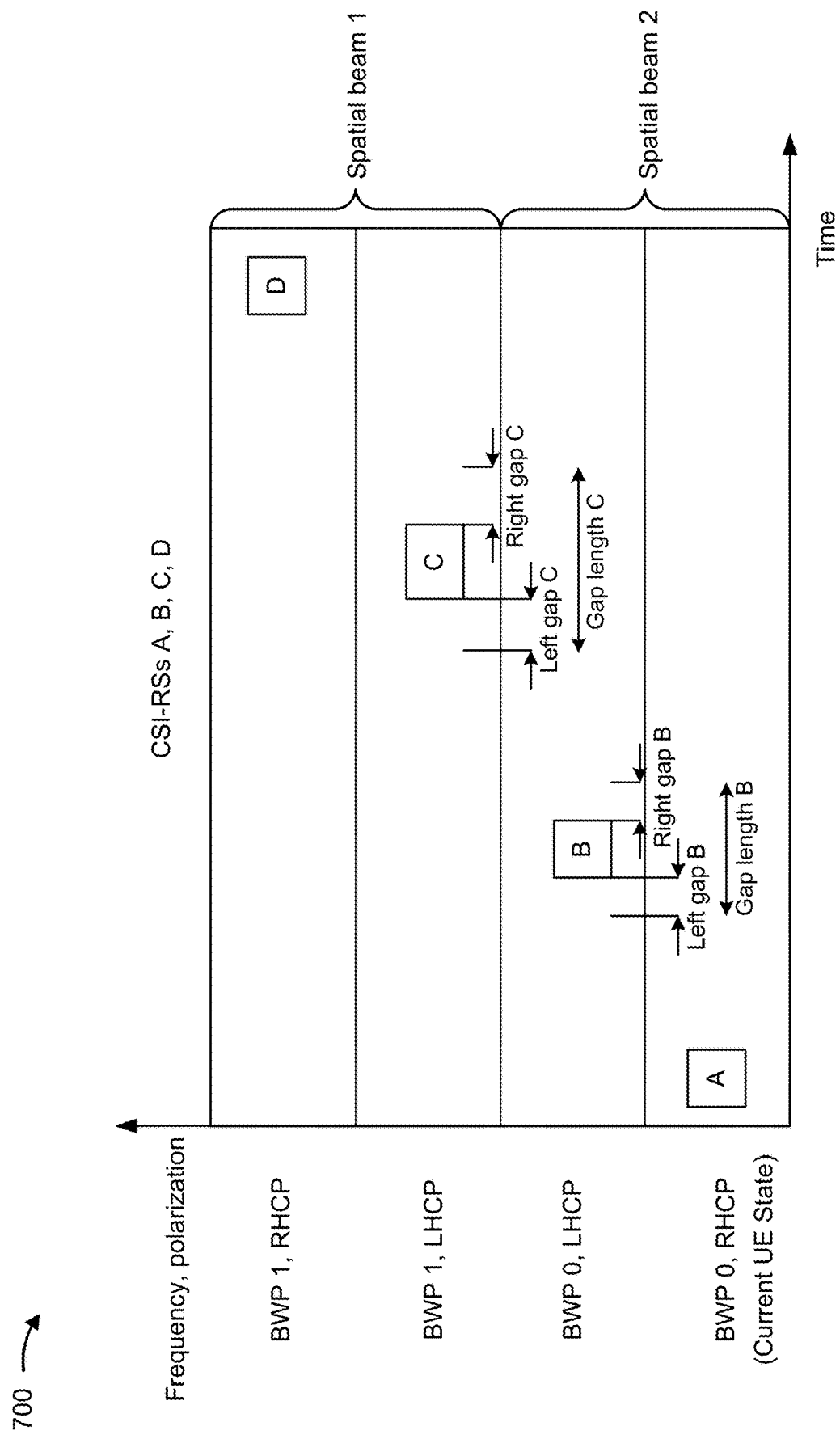
FIG. 7 is a diagram illustrating an example of measuring reference signals with polarization, in accordance with the present disclosure.

FIG. 7 is a diagram illustrating an example 700 of measuring reference signals with polarization, in accordance with the present disclosure.

A UE may determine a duration of a measurement gap based at least in part on whether a reference signal is in a same bandwidth part (BWP) in which the UE operates for transmitting and/or receiving communications. Switching BWPs may increase the duration of a measurement gap.

Example 700 shows a first spatial beam in BWP 1 and a second spatial beam in BWP 2. Example 700 also shows a reference signal A in BWP 0 with a polarization (RHCP) that is the same polarization as an antenna configuration of the UE. The UE may determine that no substantive measurement gap is needed for switching polarization or BWP to measure reference signal A.

Example 700 also shows a reference signal B that is in the same bandwidth (BWP 0) part but with a different polarization (LHCP). The UE may determine a duration of the left gap and a duration of the right gap based at least in part on a capability of the UE for switching the antenna configuration from RHCP to LHCP, and from LHCP back to RHCP for transmitting and/or receiving communications.

Example 700 also shows a reference signal C that is in a different BWP (BWP 1) and that has a different polarization (LHCP). The UE may determine that a duration of the left measurement gap and the right measurement gap for reference signal C are larger than for the left measurement gap and the right measurement gap of reference signal B, because the UE has to switch the antenna configuration for both the BWP and the polarization. An overall gap length for reference signal C is larger than an overall gap length for reference signal B.

Another reference signal D is shown, in a different BWP (BWP 1) but with a same polarization. The UE may determine durations for left and right measurement gaps for reference signal D (not shown).

As indicated above, FIG. 7 is provided as an example. Other examples may differ from what is described with regard to FIG. 7.

Figure 8:
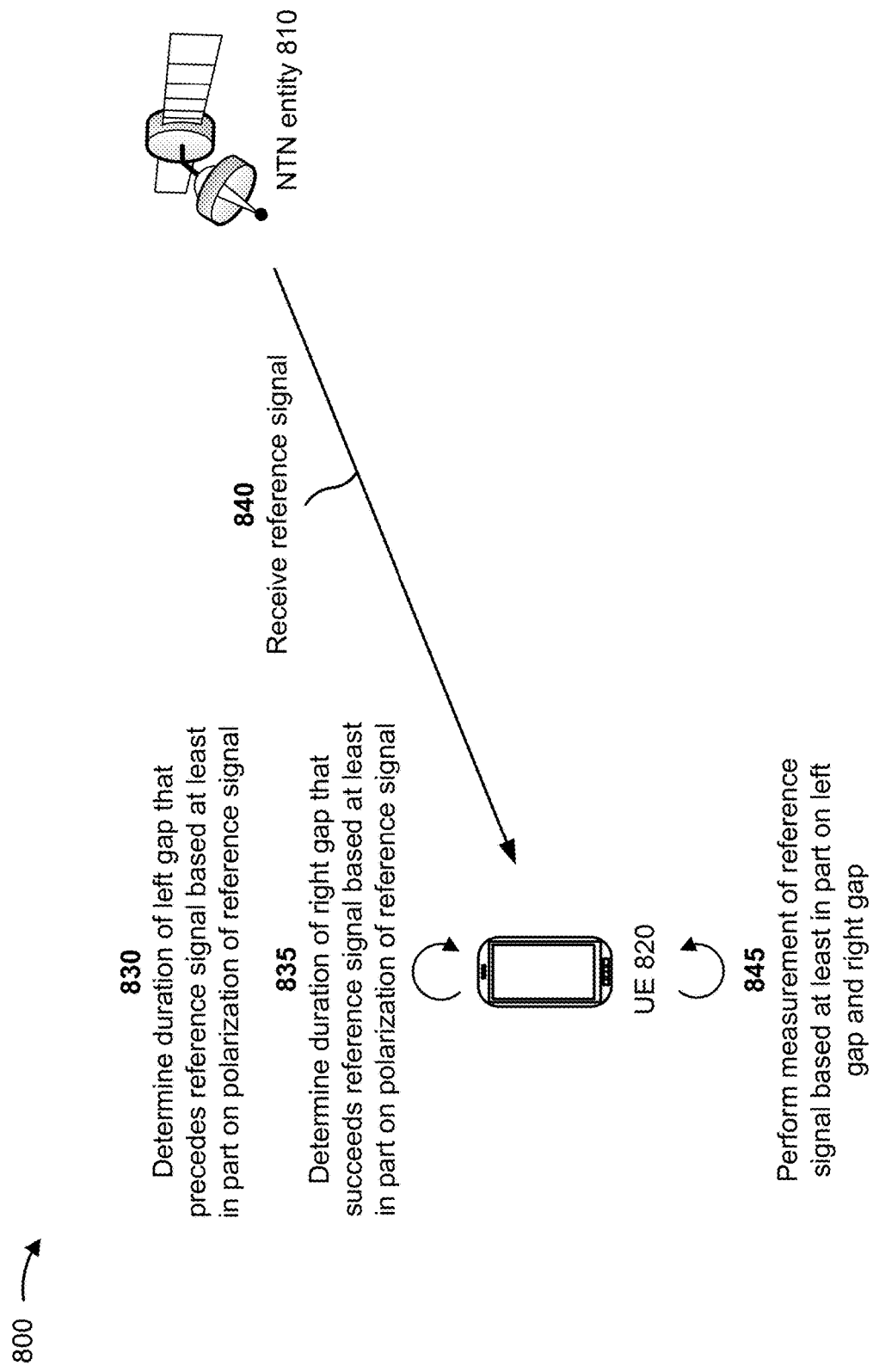
FIG. 8 is a diagram illustrating an example of measuring reference signals with polarization, in accordance with the present disclosure.

FIG. 8 is a diagram illustrating an example 800 of measuring reference signals with polarization, in accordance with the present disclosure. As shown, FIG. 8 includes an NTN entity 810 (e.g., base station, relay station) and a UE 820 that may communicate with each other. In some aspects, UE 820 may include a ground station.

As shown by reference number 830, UE 820 may determine a duration of the left gap that precedes a reference signal based at least in part on a polarization of the reference signal. The polarization of the reference signal may be different than a polarization currently used by UE 820 for communications. As shown by reference number 835, UE 820 may determine a duration of the right gap that succeeds the reference signal based at least in part on the polarization of the reference signal. In some aspects, UE 820 may determine the durations based at least in part on whether the BWP of the reference signal is the same BWP or a different BWP in which the UE was operating.

As shown by reference number 840, UE 820 may receive the reference signal from NTN entity 810. The reference signal may be a CSI-RS or a zero-transmission on a CSI interference measurement (IM) resource. As shown by reference number 845, UE 820 may perform one or more measurements of the reference signal based at least in part on the left gap and the right gap. That is, UE 820 may be configured to stop transmitting or receiving communications during the left gap to switch polarization, from an original polarization of the UE to a polarization of the reference signal, before measuring the reference signal. UE 820 may use the right gap to revert to the original polarization. The one or more measurements of the reference signal may be more accurate than if an antenna configuration did not match a polarization of the reference signal.

As indicated above, FIG. 8 is provided as an example. Other examples may differ from what is described with regard to FIG. 8.

Figure 9:
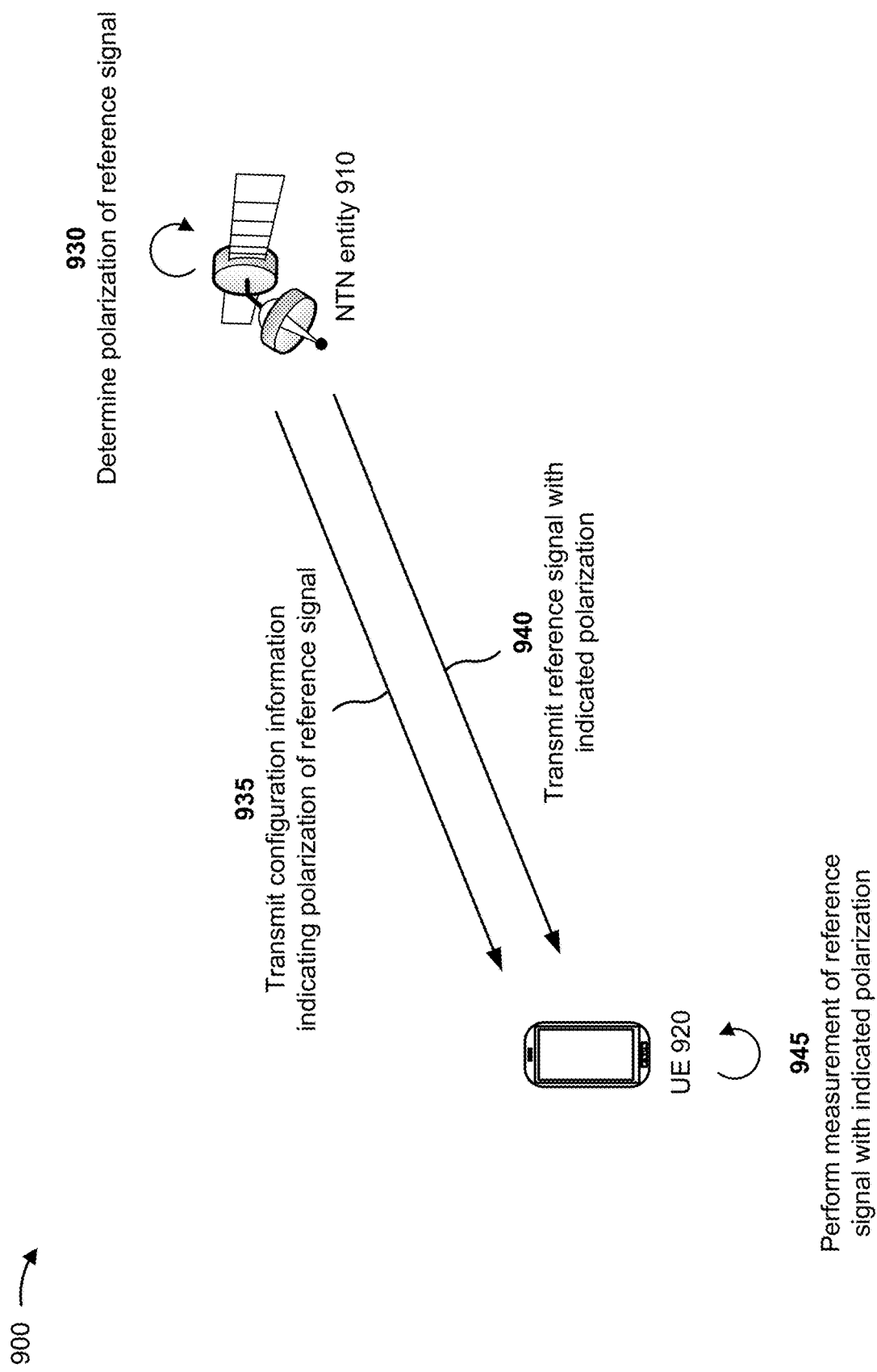
FIG. 9 is a diagram illustrating an example of measuring reference signals with polarization, in accordance with the present disclosure.

FIG. 9 is a diagram illustrating an example 900 of measuring reference signals with polarization, in accordance with the present disclosure. As shown, FIG. 9 includes an NTN entity 910 (e.g., base station, relay station) and a UE 920. In some aspects, UE 920 may include a ground station.

In some aspects, UE 920 may receive an indication of a polarization of a reference signal. For example, NTN entity 910 may determine the polarization for the reference signal, such as RHCP, LHCP, or a linear polarization. As shown by reference number 935, NTN entity 910 may transmit an indication of the polarization of the reference signal. The indication may include a reference signal identifier. The reference signal may be defined by CSI IM resources. UE 920 may prepare one or more antennas to receive the reference signal. This may include switching a polarization of the antennas.

As shown by reference number 940, NTN entity 910 may transmit the reference signal. UE 920 may prepare for and/or identify the reference signal using the reference signal identifier. In some aspects, a serving beam may not transmit anything in resource elements of the reference signal so that a measurement may quantify interference from other beams. For example, a CSI IM resource may be allocated for beam 1, and there may be no transmission (zero-transmission) on the allocated CSI IM resource. However, NTN entity 910 may transmit on beam 2, beam 3, and on other beams, and UEs being served by beam 1 may measure interference in an indicated polarization from beam 2, beam 3, and from other beams.

A beam within other beams may have the same polarization of the indicated polarization for the measurement. Alternatively, a beam within the other beams may have a different polarization from the indicated polarization. A beam within other beams of a different polarization may contribute to the measured interference because a polarization may not be perfect in practice. For example, an RHCP is in fact an elliptical polarization.

As shown by reference number 945, UE 920 may perform one or more measurements on the reference signal. The reference signal may be a CSI-RS or a CSI IM resource. Because UE 920 was signaled a polarization of the reference signal, UE 920 may save time, processing resources, and signaling resources otherwise consumed by detecting a polarization of the reference signal.

As indicated above, FIG. 9 is provided as an example. Other examples may differ from what is described with regard to FIG. 9.

Figure 10:
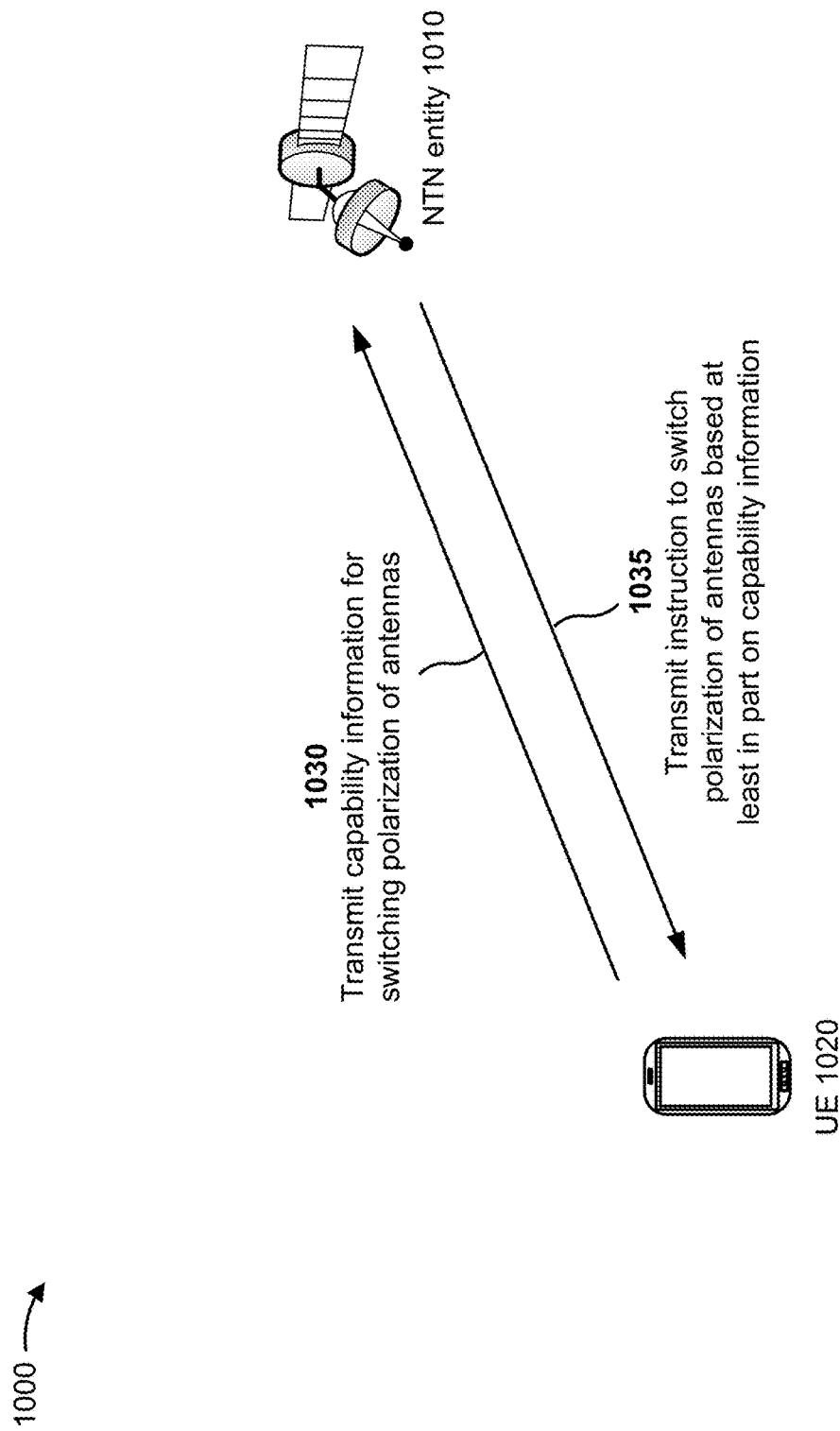
FIG. 10 is a diagram illustrating an example of switching polarization, in accordance with the present disclosure.

FIG. 10 is a diagram illustrating an example 1000 of switching polarization, in accordance with the present disclosure. As shown, FIG. 10 includes an NTN entity 1010 (e.g., base station, relay station) and a UE 1020. In some aspects, UE 1020 may include a ground station.

A UE antenna polarization capability may be useful for beam management. NTN entity 1010, or an associated network entity, may configure UE 1020 to switch to a neighboring beam with a different polarization (e.g., opposite to a polarization of a current serving beam) if UE 1020 is capable of dynamically switching an antenna polarization. Accordingly, UE 1020 may report a UE capability for a polarization and/or for dynamically switching a polarization. As shown by reference number 1030, UE 1020 may transmit capability information for switching a polarization of antennas. UE 1020 may include, in the capability information, a capability for switching polarization on a per antenna basis or a capability for the entirety of the antennas. The antennas may have different polarizations or the same polarizations. In some aspects, an antenna may be RHCP only, or LHCP only, or linear only.

The capability information may include a time for switching antenna polarization and/or a capability per type of polarization switching (e.g., a switch from one polarization to another polarization among the following: RHCP, LHCP, vertically linear, horizontally linear, linear). UE 1020 may also report whether UE 1020 cannot switch polarization, and a current polarization of the antennas.

NTN entity 1010 may determine a polarization for UE 1020 based at least in part on the capability information. As shown by reference number 1035, NTN entity 1010 may transmit an instruction to switch polarization of the antennas, or to switch to a beam with a different polarization. The instructions may be for all of the antennas or may include specific polarizations for specific antennas. UE 1020 may then proceed to transmit and/or receive communications with the polarization(s). This may include transmitting and/or receiving data and/or reference signals. With more effective coordination of polarization based on a UE capability, communications and measurements may improve with better matched polarizations.

As indicated above, FIG. 10 is provided as an example. Other examples may differ from what is described with regard to FIG. 10.

Figure 11:
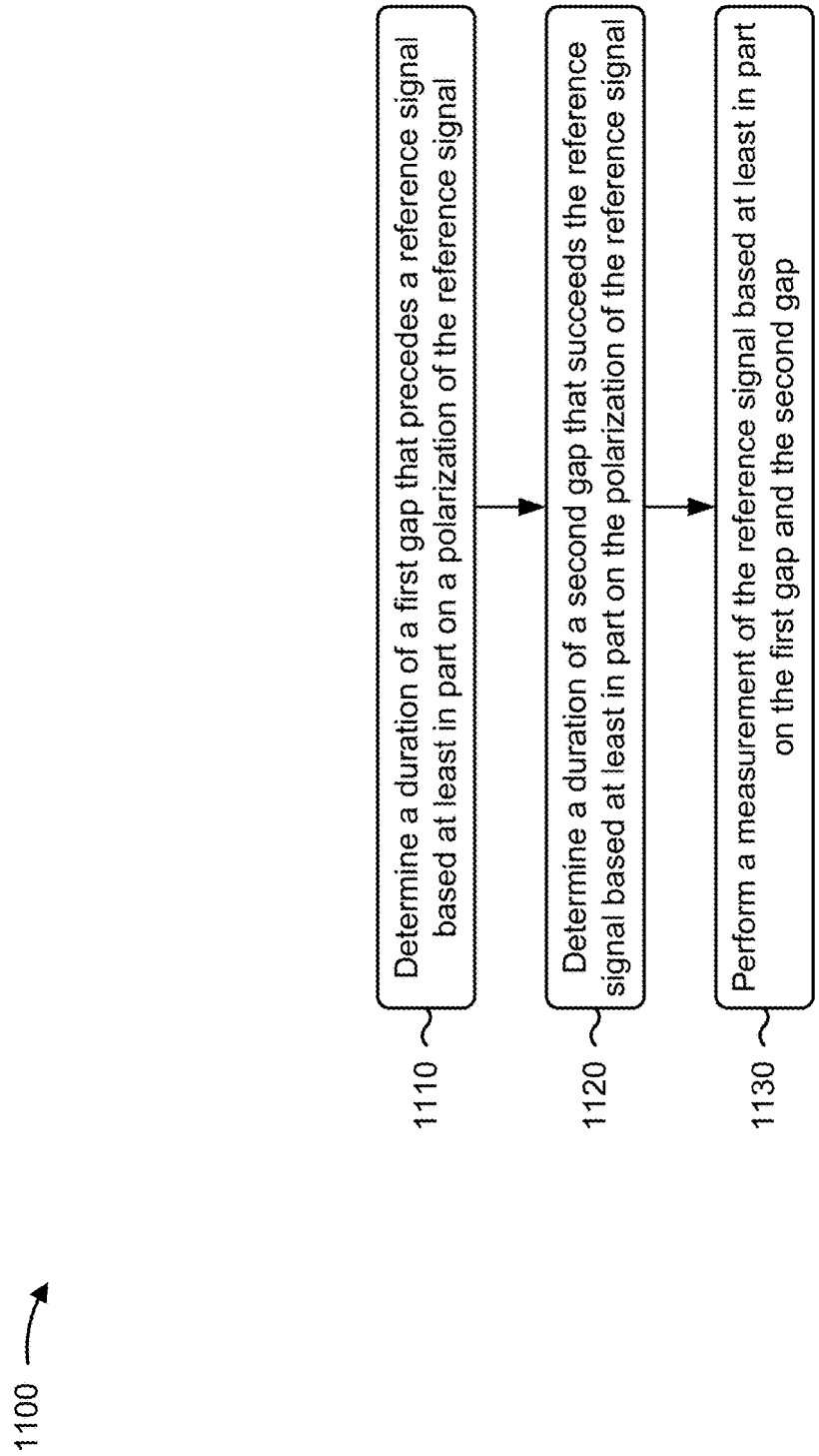
FIG. 11 is a diagram illustrating an example process performed, for example, by a UE, in accordance with the present disclosure.

FIG. 11 is a diagram illustrating an example process 1100 performed, for example, by a UE, in accordance with the present disclosure. Example process 1100 is an example where the UE (e.g., UE 120 depicted in FIGS. 1-3, UE 820 depicted in FIG. 8) performs operations associated with measuring reference signals with polarization.

As shown in FIG. 11, in some aspects, process 1100 may include determining a duration of a first gap that precedes a reference signal based at least in part on a polarization of the reference signal (block 1110). For example, the UE (e.g., using gap determination component 1608 depicted in FIG. 16) may determine a duration of a first gap that precedes a reference signal based at least in part on a polarization of the reference signal, as described above.

As further shown in FIG. 11, in some aspects, process 1100 may include determining a duration of a second gap that succeeds the reference signal based at least in part on the polarization of the reference signal (block 1120). For example, the UE (e.g., using gap determination component 1608 depicted in FIG. 16) may determine a duration of a second gap that succeeds the reference signal based at least in part on the polarization of the reference signal, as described above.

As further shown in FIG. 11, in some aspects, process 1100 may include performing a measurement of the reference signal based at least in part on the first gap and the second gap (block 1130). For example, the UE (e.g., using measurement component 1610 depicted in FIG. 16) may perform a measurement of the reference signal based at least in part on the first gap and the second gap, as described above.

Process 1100 may include additional aspects, such as any single aspect or any combination of aspects described below and/or in connection with one or more other processes described elsewhere herein.

With respect to process 1100, in a first aspect, performing the measurement of the reference signal includes switching, during the first gap, an antenna configuration to the polarization of the reference signal from a different polarization, and reverting, during the second gap, the antenna configuration to the different polarization.

In a second aspect, alone or in combination with the first aspect, determining the duration of the first gap includes determining the duration of the first gap based at least in part on a difference between the polarization of the reference signal and the different polarization.

In a third aspect, alone or in combination with one or more of the first and second aspects, determining the duration of the second gap includes determining the duration of the second gap based at least in part on a difference between the polarization of the reference signal and the different polarization.

In a fourth aspect, alone or in combination with one or more of the first through third aspects, determining the duration of the first gap includes determining the duration of the first gap based at least in part on one or more of a bandwidth part for the reference signal or a bandwidth part used before the first gap.

In a fifth aspect, alone or in combination with one or more of the first through fourth aspects, the bandwidth part for the reference signal and the bandwidth part used before the first gap are the same bandwidth part.

In a sixth aspect, alone or in combination with one or more of the first through fourth aspects, the bandwidth part for the reference signal is different than the bandwidth part used before the first gap.

In a seventh aspect, alone or in combination with one or more of the first through sixth aspects, determining the duration of the second gap includes determining the duration of the second gap based at least in part on one or more of a bandwidth part for the reference signal or a bandwidth part used before the first gap.

In an eighth aspect, alone or in combination with one or more of the first through seventh aspects, determining the duration of the first gap includes determining the duration of the first gap based at least in part on one or more of a spatial relation for the reference signal or a spatial relation used before the first gap.

In a ninth aspect, alone or in combination with one or more of the first through eighth aspects, determining the duration of the second gap includes determining the duration of the second gap based at least in part on one or more of a spatial relation for the reference signal or a spatial relation used before the first gap.

In a tenth aspect, alone or in combination with one or more of the first through ninth aspects, performing the measurement of the reference signal includes determining one or more of an L3 RSRP or an L1 RSRP of the reference signal.

In an eleventh aspect, alone or in combination with one or more of the first through tenth aspects, the reference signal is one of a CSI-RS or a zero-transmission on an allocated CSI IM resource.

In a twelfth aspect, alone or in combination with one or more of the first through eleventh aspects, the CSI IM resource is beam specific, where a beam is identified by one or more of an SSB index, a physical cell identity, or a satellite beam identity.

In a thirteenth aspect, alone or in combination with one or more of the first through tenth aspects, process 1100 includes measuring interference, in an indicated polarization, from one or more beams.

Although FIG. 11 shows example blocks of process 1100, in some aspects, process 1100 may include additional blocks, fewer blocks, different blocks, or differently arranged blocks than those depicted in FIG. 11. Additionally, or alternatively, two or more of the blocks of process 1100 may be performed in parallel.

Figure 12:
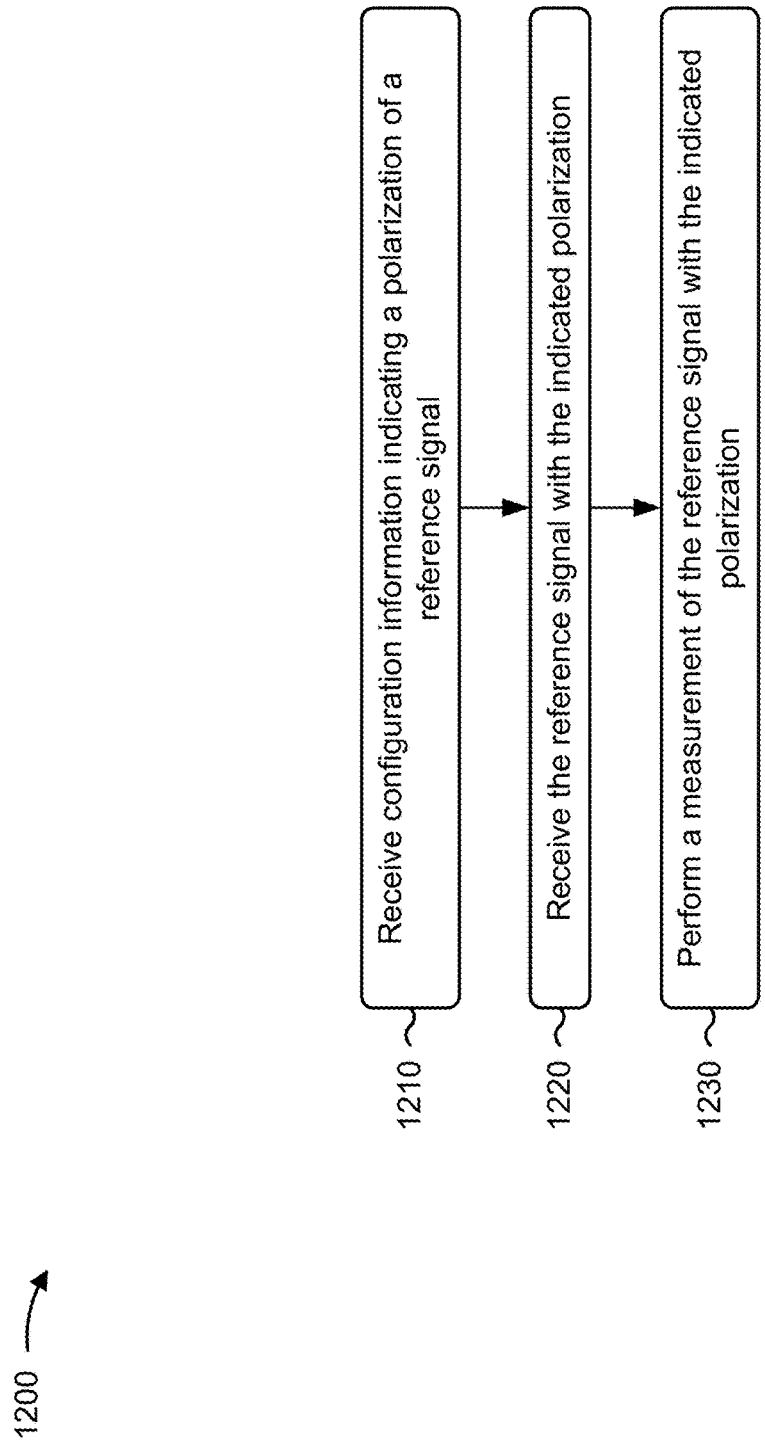
FIG. 12 is a diagram illustrating an example process performed, for example, by a UE, in accordance with the present disclosure.

FIG. 12 is a diagram illustrating an example process 1200 performed, for example, by a UE, in accordance with the present disclosure. Example process 1200 is an example where the UE (e.g., UE 120 depicted in FIGS. 1-3, UE 920 depicted in FIG. 9) performs operations associated with measuring reference signals with polarization.

As shown in FIG. 12, in some aspects, process 1200 may include receiving configuration information indicating a polarization of a reference signal (block 1210). For example, the UE (e.g., using reception component 1702 depicted in FIG. 17) may receive configuration information indicating a polarization of a reference signal, as described above.

As further shown in FIG. 12, in some aspects, process 1200 may include receiving the reference signal with the indicated polarization (block 1220). For example, the UE (e.g., using reception component 1702 depicted in FIG. 17) may receive the reference signal with the indicated polarization, as described above.

As further shown in FIG. 12, in some aspects, process 1200 may include performing a measurement of the reference signal with the indicated polarization (block 1230). For example, the UE (e.g., using measurement component 1708 depicted in FIG. 17) may perform a measurement of the reference signal with the indicated polarization, as described above.

Process 1200 may include additional aspects, such as any single aspect or any combination of aspects described below and/or in connection with one or more other processes described elsewhere herein.

With respect to process 1200, in a first aspect, receiving the reference signal includes receiving the reference signal in a CSI IM resource.

In a second aspect, alone or in combination with the first aspect, performing the measurement of the reference signal includes performing the measurement of the reference signal in a beam among a plurality of beams with a same polarization as the indicated polarization.

In a third aspect, alone or in combination with the first aspect, performing the measurement of the reference signal includes performing the measurement of the reference signal in a beam among a plurality of beams with different polarizations than the indicated polarization.

Although FIG. 12 shows example blocks of process 1200, in some aspects, process 1200 may include additional blocks, fewer blocks, different blocks, or differently arranged blocks than those depicted in FIG. 12. Additionally, or alternatively, two or more of the blocks of process 1200 may be performed in parallel.

Figure 13:
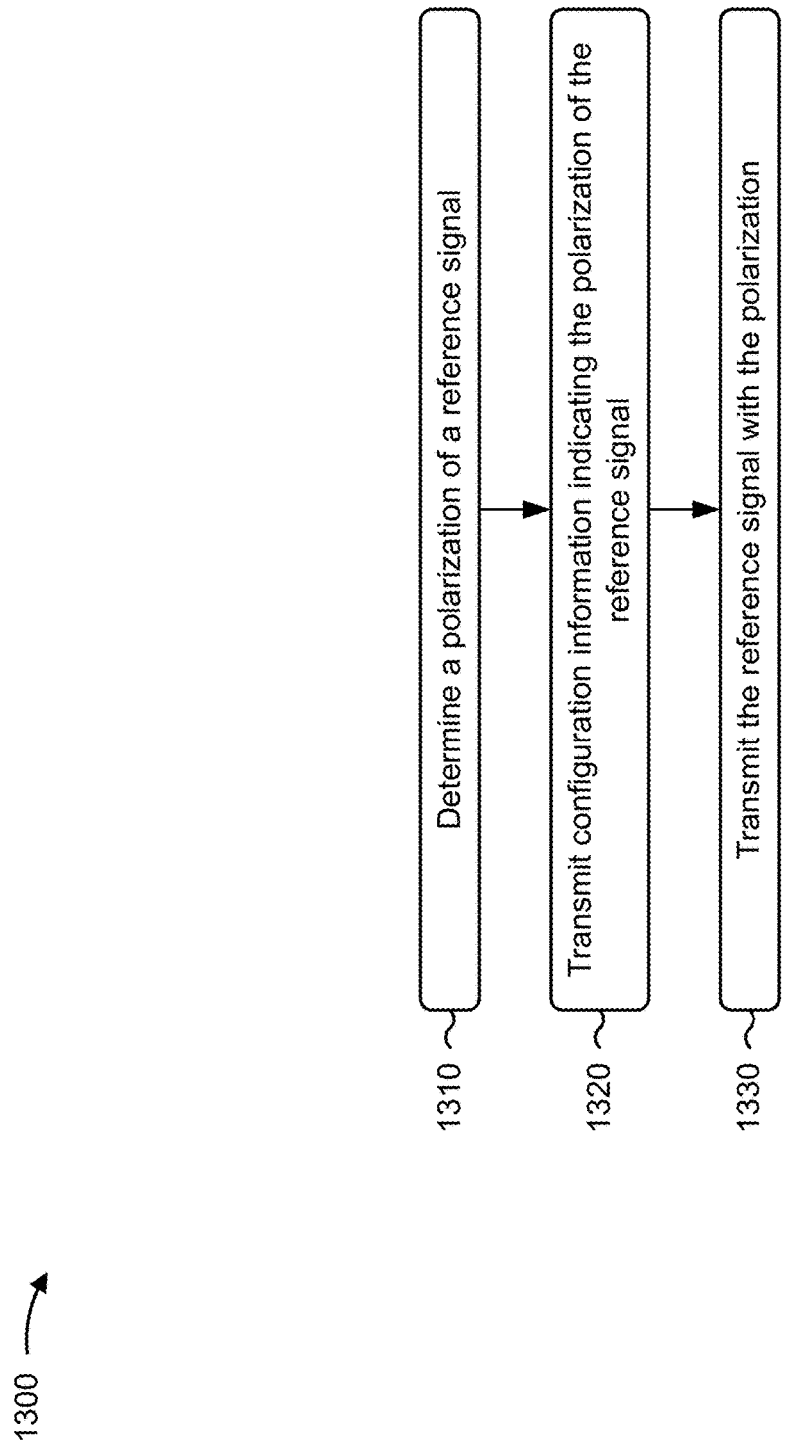
FIG. 13 is a diagram illustrating an example process performed, for example, by an NTN entity, in accordance with the present disclosure.

FIG. 13 is a diagram illustrating an example process 1300 performed, for example, by an NTN entity (e.g., base station, relay station), in accordance with the present disclosure. Example process 1300 is an example where the NTN entity (e.g., base station 110 depicted in FIGS. 1-3, NTN entity depicted in FIG. 1, satellite 320 or satellite 340 depicted in FIG. 3, NTN entity 810 depicted in FIG. 8, NTN entity 910 depicted in FIG. 9) performs operations associated with measuring reference signals with polarization.

As shown in FIG. 13, in some aspects, process 1300 may include determining a polarization of a reference signal (block 1310). For example, the NTN entity (e.g., using determination component 1808 depicted in FIG. 18) may determine a polarization of a reference signal, as described above.

As further shown in FIG. 13, in some aspects, process 1300 may include transmitting configuration information indicating the polarization of the reference signal (block 1320). For example, the NTN entity (e.g., using transmission component 1804 depicted in FIG. 18) may transmit configuration information indicating the polarization of the reference signal, as described above.

As further shown in FIG. 13, in some aspects, process 1300 may include transmitting the reference signal with the polarization (block 1330). For example, the NTN entity (e.g., using transmission component 1804 depicted in FIG. 18) may transmit the reference signal with the polarization, as described above.

Process 1300 may include additional aspects, such as any single aspect or any combination of aspects described below and/or in connection with one or more other processes described elsewhere herein.

With respect to process 1300, in a first aspect, transmitting the reference signal includes transmitting the reference signal in a CSI IM resource.

In a second aspect, alone or in combination with the first aspect, transmitting the reference signal includes transmitting a zero-power (ZP) signal for a plurality of UEs being served by a serving beam.

In a third aspect, alone or in combination with the first aspect, process 1300 includes transmitting a non-zero power (NZP) signal in a channel state information interference measurement resource on one or more other beams.

In a fourth aspect, alone or in combination with one or more of the first and second aspects, a beam is identified by one or more of an SSB index, a satellite beam index, or a physical cell identity.

Although FIG. 13 shows example blocks of process 1300, in some aspects, process 1300 may include additional blocks, fewer blocks, different blocks, or differently arranged blocks than those depicted in FIG. 13. Additionally, or alternatively, two or more of the blocks of process 1300 may be performed in parallel.

Figure 14:
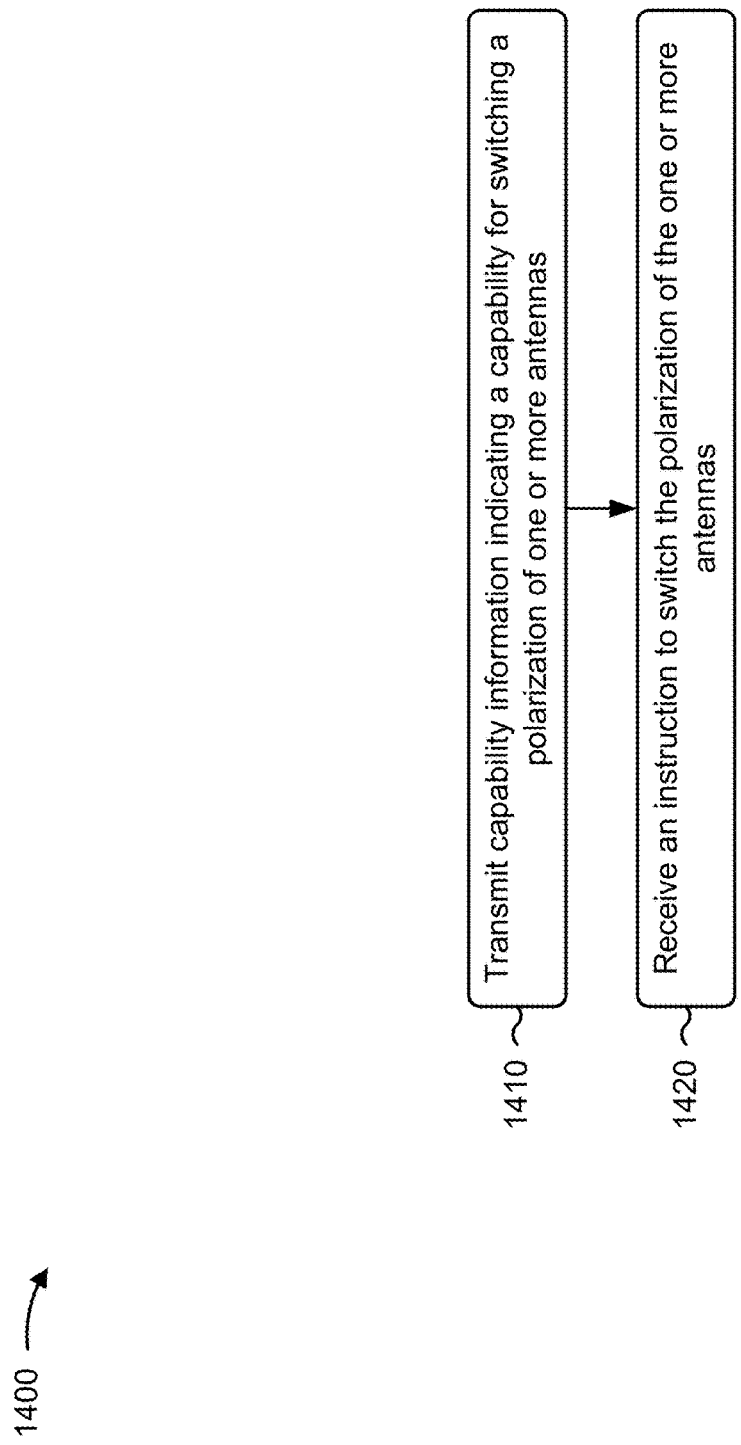
FIG. 14 is a diagram illustrating an example process performed, for example, by a UE, in accordance with the present disclosure.

FIG. 14 is a diagram illustrating an example process 1400 performed, for example, by a UE, in accordance with the present disclosure. Example process 1400 is an example where the UE (e.g., UE 120 depicted in FIGS. 1-3, UE 1020 depicted in FIG. 10) performs operations associated with measuring reference signals with polarization.

As shown in FIG. 14, in some aspects, process 1400 may include transmitting capability information indicating a capability for switching a polarization of one or more antennas (block 1410). For example, the UE (e.g., using transmission component 1904 depicted in FIG. 19) may transmit capability information indicating a capability for switching a polarization of one or more antennas, as described above.

As further shown in FIG. 14, in some aspects, process 1400 may include receiving an instruction to switch the polarization of the one or more antennas (block 1420). For example, the UE (e.g., using reception component 1902 depicted in FIG. 19) may receive an instruction to switch the polarization of the one or more antennas, as described above.

Process 1400 may include additional aspects, such as any single aspect or any combination of aspects described below and/or in connection with one or more other processes described elsewhere herein.

With respect to process 1400, in a first aspect, the capability information indicates a capability for switching the polarization per antenna of the one or more antennas.

In a second aspect, alone or in combination with the first aspect, the capability information indicates a time for switching the polarization of the one or more antennas.

In a third aspect, alone or in combination with one or more of the first and second aspects, the capability information indicates one or more types of polarization switching.

In a fourth aspect, the capability information indicates that the UE is not capable of switching the polarization of the one or more antennas, and the capability information indicates the polarization of the one or more antennas.

Although FIG. 14 shows example blocks of process 1400, in some aspects, process 1400 may include additional blocks, fewer blocks, different blocks, or differently arranged blocks than those depicted in FIG. 14. Additionally, or alternatively, two or more of the blocks of process 1400 may be performed in parallel.

Figure 15:
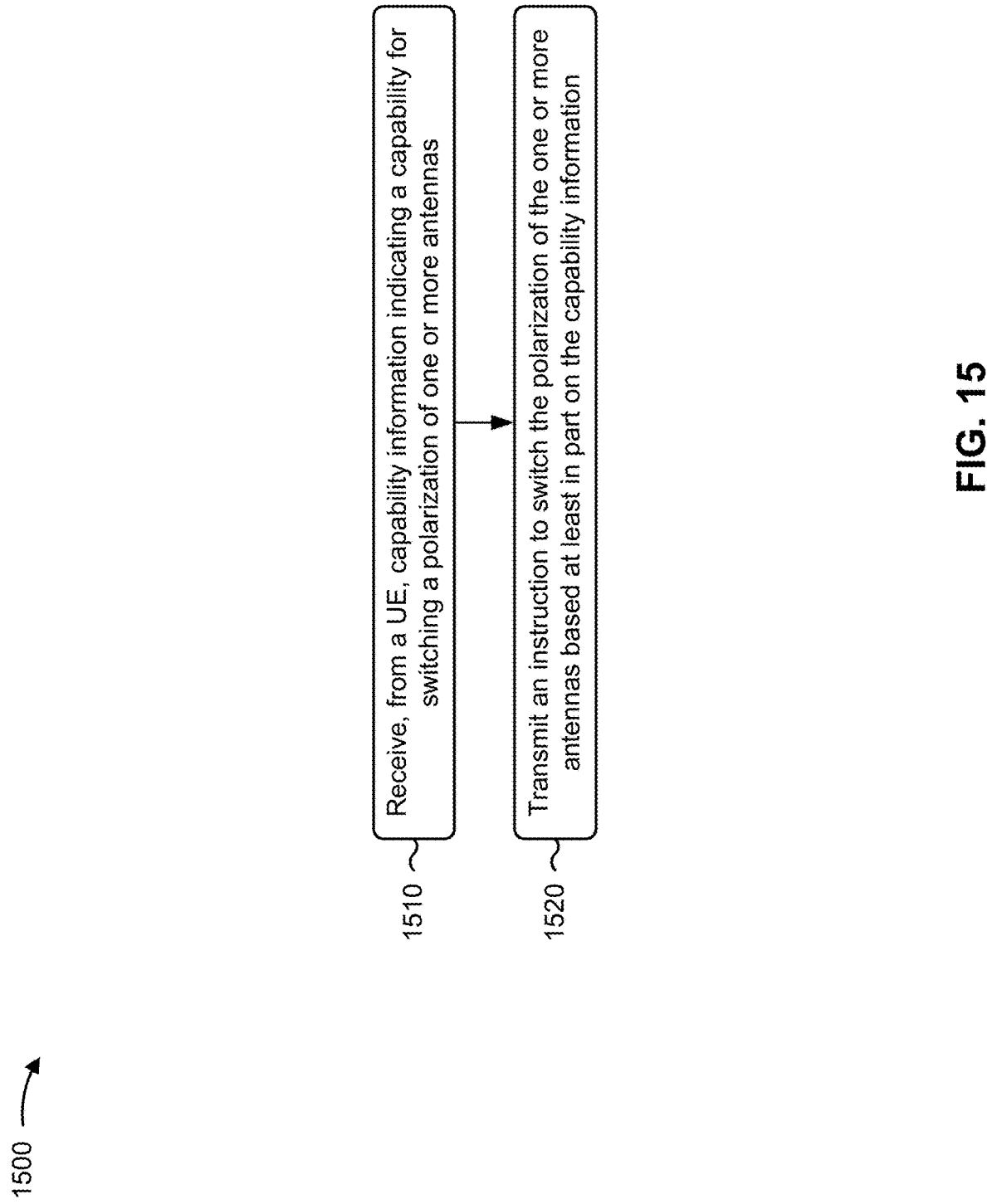
FIG. 15 is a diagram illustrating an example process performed, for example, by an NTN entity, in accordance with the present disclosure.

FIG. 15 is a diagram illustrating an example process 1500 performed, for example, by an NTN entity (e.g., base station, relay station), in accordance with the present disclosure. Example process 1500 is an example where the NTN entity (e.g., base station 110 depicted in FIGS. 1-3, NTN entity depicted in FIG. 1, satellite 320 or satellite 340 depicted in FIG. 3, NTN entity 810 depicted in FIG. 8, NTN entity 1010 depicted in FIG. 10) performs operations associated with measuring reference signals with polarization.

As shown in FIG. 15, in some aspects, process 1500 may include receiving, from a UE, capability information indicating a capability for switching a polarization of one or more antennas (block 1510). For example, the NTN entity (e.g., using reception component 2002 depicted in FIG. 20) may receive, from a UE, capability information indicating a capability for switching a polarization of one or more antennas, as described above.

As further shown in FIG. 15, in some aspects, process 1500 may include transmitting an instruction to switch the polarization of the one or more antennas based at least in part on the capability information (block 1520). For example, the NTN entity (e.g., using transmission component 2004 depicted in FIG. 20) may transmit an instruction to switch the polarization of the one or more antennas based at least in part on the capability information, as described above.

Process 1500 may include additional aspects, such as any single aspect or any combination of aspects described below and/or in connection with one or more other processes described elsewhere herein.

In a first aspect, the capability information indicates a capability for switching the polarization per antenna of the one or more antennas.

In a second aspect, alone or in combination with the first aspect, the capability information indicates a time for switching the polarization of the one or more antennas.

In a third aspect, alone or in combination with one or more of the first and second aspects, the capability information indicates one or more types of polarization switching.

In a fourth aspect, alone or in combination with one or more of the first through third aspects, the capability information indicates that the UE is not capable of switching the polarization of the one or more antennas, and the capability information indicates the polarization of the one or more antennas.

Although FIG. 15 shows example blocks of process 1500, in some aspects, process 1500 may include additional blocks, fewer blocks, different blocks, or differently arranged blocks than those depicted in FIG. 15. Additionally, or alternatively, two or more of the blocks of process 1500 may be performed in parallel.

Figure 16:
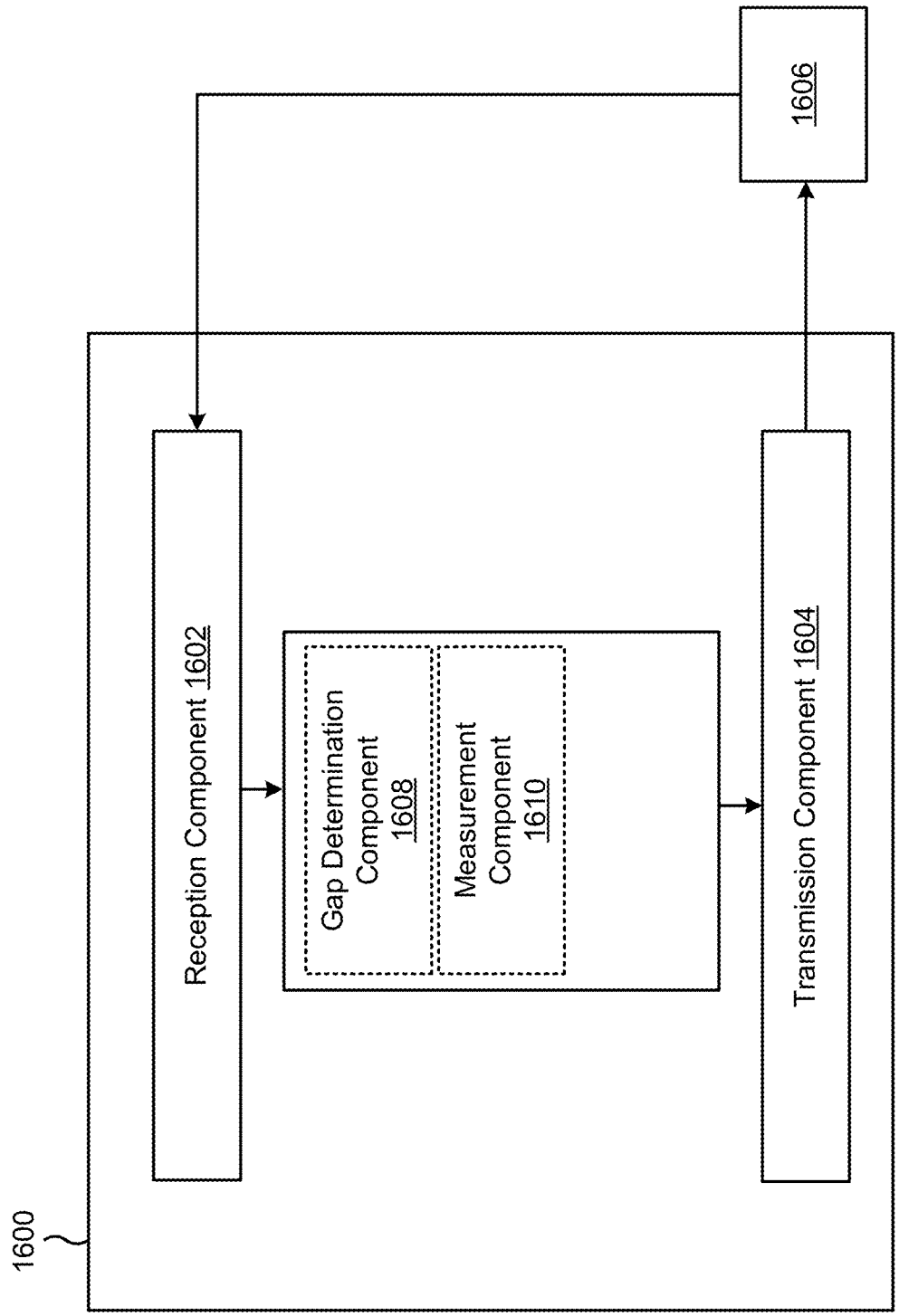
FIGS. 16-20 are block diagrams of example apparatuses for wireless communication, in accordance with the present disclosure.

FIG. 16 is a block diagram of an example apparatus 1600 for wireless communication. The apparatus 1600 may be a UE, or a UE may include the apparatus 1600. In some aspects, the apparatus 1600 includes a reception component 1602 and a transmission component 1604, which may be in communication with one another (for example, via one or more buses and/or one or more other components). As shown, the apparatus 1600 may communicate with another apparatus 1606 (such as a UE, a base station, an NTN entity, or another wireless communication device) using the reception component 1602 and the transmission component 1604. As further shown, the apparatus 1600 may include a gap determination component 1608, and/or a measurement component 1610, among other examples.

In some aspects, the apparatus 1600 may be configured to perform one or more operations described herein in connection with FIGS. 1-10. Additionally, or alternatively, the apparatus 1600 may be configured to perform one or more processes described herein, such as process 1100 of FIG. 11. In some aspects, the apparatus 1600 and/or one or more components shown in FIG. 16 may include one or more components of the UE described above in connection with FIG. 2. Additionally, or alternatively, one or more components shown in FIG. 16 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1602 may receive communications, such as reference signals, control information, data communications, or a combination thereof, from the apparatus 1606. The reception component 1602 may provide received communications to one or more other components of the apparatus 1600. In some aspects, the reception component 1602 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1600. In some aspects, the reception component 1602 may include one or more antennas, a demodulator, a MIMO detector, a receive processor, a controller/processor, a memory, or a combination thereof, of the UE described above in connection with FIG. 2.

The transmission component 1604 may transmit communications, such as reference signals, control information, data communications, or a combination thereof, to the apparatus 1606. In some aspects, one or more other components of the apparatus 1600 may generate communications and may provide the generated communications to the transmission component 1604 for transmission to the apparatus 1606. In some aspects, the transmission component 1604 may perform signal processing on the generated communications (such as filtering, amplification, modulation, digital-to-analog conversion, multiplexing, interleaving, mapping, or encoding, among other examples), and may transmit the processed signals to the apparatus 1606. In some aspects, the transmission component 1604 may include one or more antennas, a modulator, a transmit MIMO processor, a transmit processor, a controller/processor, a memory, or a combination thereof, of the UE described above in connection with FIG. 2. In some aspects, the transmission component 1604 may be co-located with the reception component 1602 in a transceiver.

The gap determination component 1608 may determine a duration of a first gap that precedes a reference signal based at least in part on a polarization of the reference signal. In some aspects, the gap determination component 1608 may include a controller/processor, a memory, or a combination thereof, of the UE described above in connection with FIG. 2. The gap determination component 1608 may determine a duration of a second gap that succeeds the reference signal based at least in part on the polarization of the reference signal.

The measurement component 1610 may perform a measurement of the reference signal based at least in part on the first gap and the second gap. In some aspects, the measurement component 1610 may include one or more antennas, a demodulator, a MIMO detector, a receive processor, a controller/processor, a memory, or a combination thereof, of the UE described above in connection with FIG. 2.

The number and arrangement of components shown in FIG. 16 are provided as an example. In practice, there may be additional components, fewer components, different components, or differently arranged components than those shown in FIG. 16. Furthermore, two or more components shown in FIG. 16 may be implemented within a single component, or a single component shown in FIG. 16 may be implemented as multiple, distributed components. Additionally, or alternatively, a set of (one or more) components shown in FIG. 16 may perform one or more functions described as being performed by another set of components shown in FIG. 16.

Figure 17:
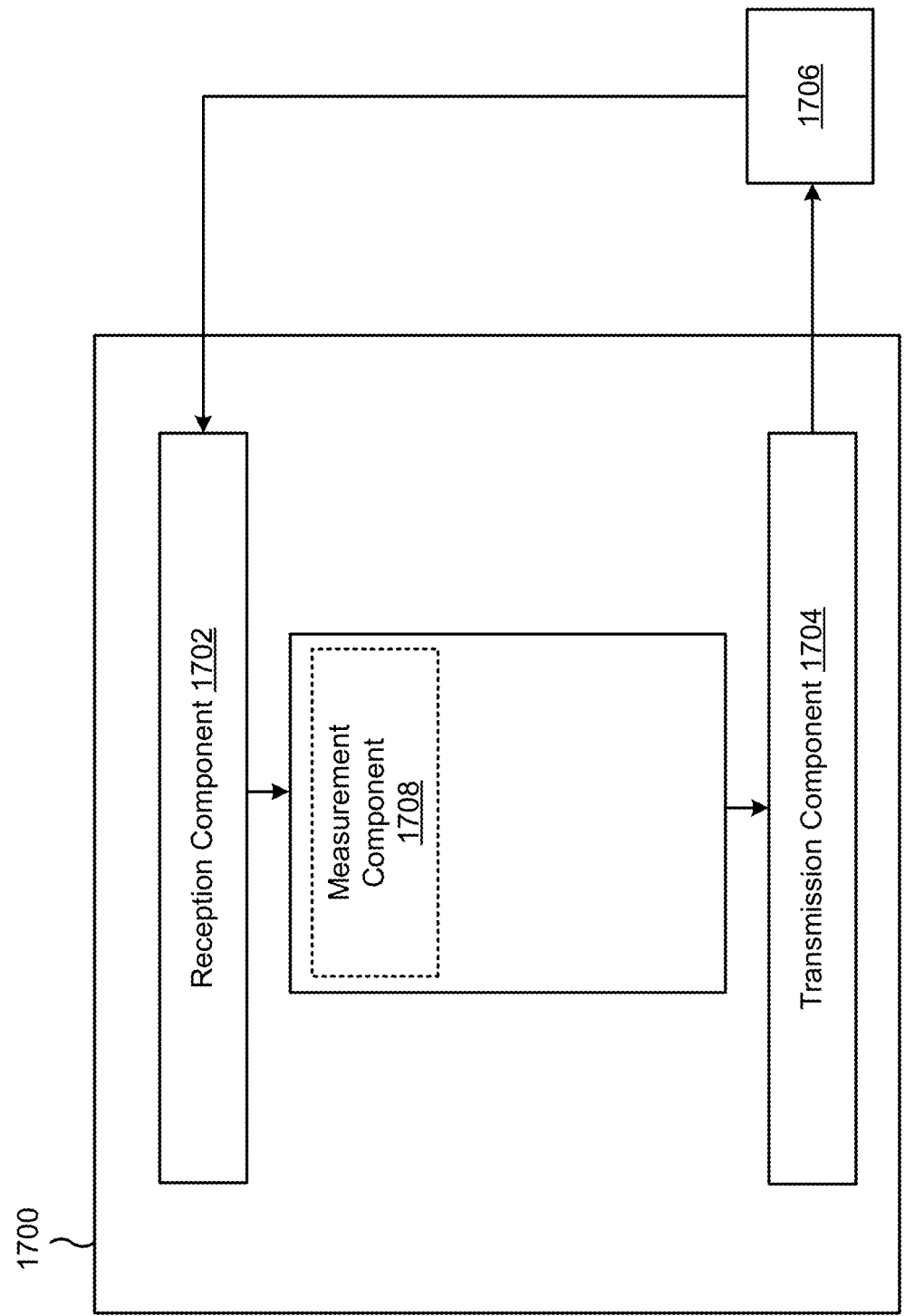

FIG. 17 is a block diagram of an example apparatus 1700 for wireless communication. The apparatus 1700 may be a UE, or a UE may include the apparatus 1700. In some aspects, the apparatus 1700 includes a reception component 1702 and a transmission component 1704, which may be in communication with one another (for example, via one or more buses and/or one or more other components). As shown, the apparatus 1700 may communicate with another apparatus 1706 (such as a UE, a base station, an NTN entity, or another wireless communication device) using the reception component 1702 and the transmission component 1704. As further shown, the apparatus 1700 may include a measurement component 1708, among other examples.

In some aspects, the apparatus 1700 may be configured to perform one or more operations described herein in connection with FIGS. 1-10. Additionally, or alternatively, the apparatus 1700 may be configured to perform one or more processes described herein, such as process 1200 of FIG. 12. In some aspects, the apparatus 1700 and/or one or more components shown in FIG. 17 may include one or more components of the UE described above in connection with FIG. 2. Additionally, or alternatively, one or more components shown in FIG. 17 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1702 may receive communications, such as reference signals, control information, data communications, or a combination thereof, from the apparatus 1706. The reception component 1702 may provide received communications to one or more other components of the apparatus 1700. In some aspects, the reception component 1702 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1700. In some aspects, the reception component 1702 may include one or more antennas, a demodulator, a MIMO detector, a receive processor, a controller/processor, a memory, or a combination thereof, of the UE described above in connection with FIG. 2.

The transmission component 1704 may transmit communications, such as reference signals, control information, data communications, or a combination thereof, to the apparatus 1706. In some aspects, one or more other components of the apparatus 1700 may generate communications and may provide the generated communications to the transmission component 1704 for transmission to the apparatus 1706. In some aspects, the transmission component 1704 may perform signal processing on the generated communications (such as filtering, amplification, modulation, digital-to-analog conversion, multiplexing, interleaving, mapping, or encoding, among other examples), and may transmit the processed signals to the apparatus 1706. In some aspects, the transmission component 1704 may include one or more antennas, a modulator, a transmit MIMO processor, a transmit processor, a controller/processor, a memory, or a combination thereof, of the UE described above in connection with FIG. 2. In some aspects, the transmission component 1704 may be co-located with the reception component 1702 in a transceiver.

The reception component 1702 may receive configuration information indicating a polarization of a reference signal. The reception component 1702 may receive the reference signal with the indicated polarization. The measurement component 1708 may perform a measurement of the reference signal with the indicated polarization. In some aspects, the measurement component 1708 may include one or more antennas, a demodulator, a MIMO detector, a receive processor, a controller/processor, a memory, or a combination thereof, of the UE described above in connection with FIG. 2.

The number and arrangement of components shown in FIG. 17 are provided as an example. In practice, there may be additional components, fewer components, different components, or differently arranged components than those shown in FIG. 17. Furthermore, two or more components shown in FIG. 17 may be implemented within a single component, or a single component shown in FIG. 17 may be implemented as multiple, distributed components. Additionally, or alternatively, a set of (one or more) components shown in FIG. 17 may perform one or more functions described as being performed by another set of components shown in FIG. 17.

Figure 18:
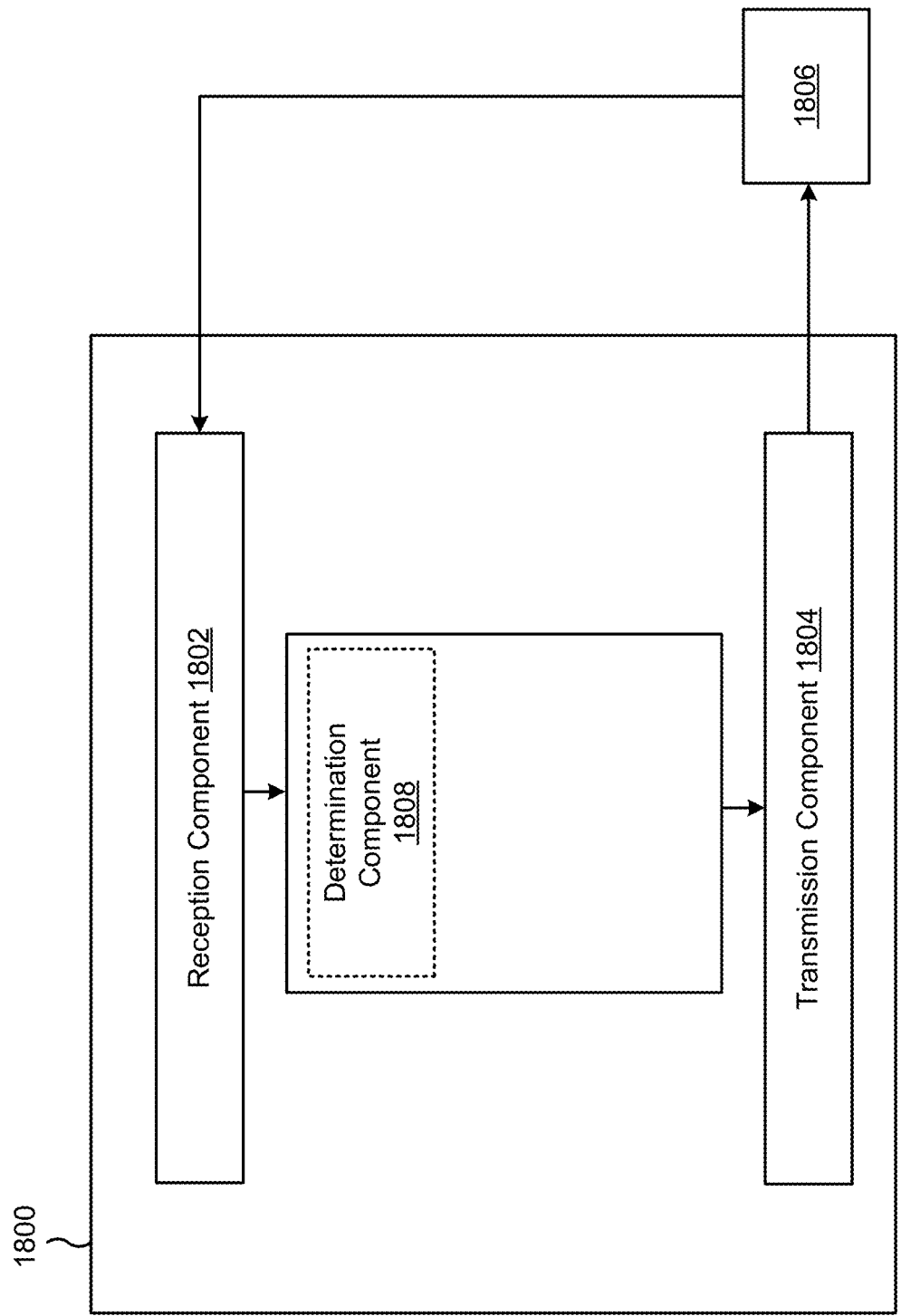

FIG. 18 is a block diagram of an example apparatus 1800 for wireless communication. The apparatus 1800 may be an NTN entity, or an NTN entity may include the apparatus 1800. In some aspects, the apparatus 1800 includes a reception component 1802 and a transmission component 1804, which may be in communication with one another (for example, via one or more buses and/or one or more other components). As shown, the apparatus 1800 may communicate with another apparatus 1806 (such as a UE, a base station, or another wireless communication device) using the reception component 1802 and the transmission component 1804. As further shown, the apparatus 1800 may include a determination component 1808, among other examples.

In some aspects, the apparatus 1800 may be configured to perform one or more operations described herein in connection with FIGS. 1-10. Additionally, or alternatively, the apparatus 1800 may be configured to perform one or more processes described herein, such as process 1300 of FIG. 13. In some aspects, the apparatus 1800 and/or one or more components shown in FIG. 18 may include one or more components of the NTN entity described above in connection with FIGS. 1-3. Additionally, or alternatively, one or more components shown in FIG. 18 may be implemented within one or more components described above in connection with FIGS. 1-3. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1802 may receive communications, such as reference signals, control information, data communications, or a combination thereof, from the apparatus 1806. The reception component 1802 may provide received communications to one or more other components of the apparatus 1800. In some aspects, the reception component 1802 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1800. In some aspects, the reception component 1802 may include one or more antennas, a demodulator, a MIMO detector, a receive processor, a controller/processor, a memory, or a combination thereof, of the NTN entity described above in connection with FIGS. 1-3.

The transmission component 1804 may transmit communications, such as reference signals, control information, data communications, or a combination thereof, to the apparatus 1806. In some aspects, one or more other components of the apparatus 1800 may generate communications and may provide the generated communications to the transmission component 1804 for transmission to the apparatus 1806. In some aspects, the transmission component 1804 may perform signal processing on the generated communications (such as filtering, amplification, modulation, digital-to-analog conversion, multiplexing, interleaving, mapping, or encoding, among other examples), and may transmit the processed signals to the apparatus 1806. In some aspects, the transmission component 1804 may include one or more antennas, a modulator, a transmit MIMO processor, a transmit processor, a controller/processor, a memory, or a combination thereof, of the NTN entity described above in connection with FIGS. 1-3. In some aspects, the transmission component 1804 may be co-located with the reception component 1802 in a transceiver.

The determination component 1808 may determine a polarization of a reference signal. In some aspects, the determination component 1808 may include a controller/processor, a memory, or a combination thereof, of the NTN entity described above in connection with FIGS. 1-3. The transmission component 1804 may transmit configuration information indicating the polarization of the reference signal. The transmission component 1804 may transmit the reference signal with the polarization. The transmission component 1804 may transmit a zero-power signal for a plurality of UEs being served by a serving beam. The transmission component 1804 may transmit an NZP signal in a channel state information interference measurement resource on one or more other beams.

The number and arrangement of components shown in FIG. 18 are provided as an example. In practice, there may be additional components, fewer components, different components, or differently arranged components than those shown in FIG. 18. Furthermore, two or more components shown in FIG. 18 may be implemented within a single component, or a single component shown in FIG. 18 may be implemented as multiple, distributed components. Additionally, or alternatively, a set of (one or more) components shown in FIG. 18 may perform one or more functions described as being performed by another set of components shown in FIG. 18.

Figure 19:
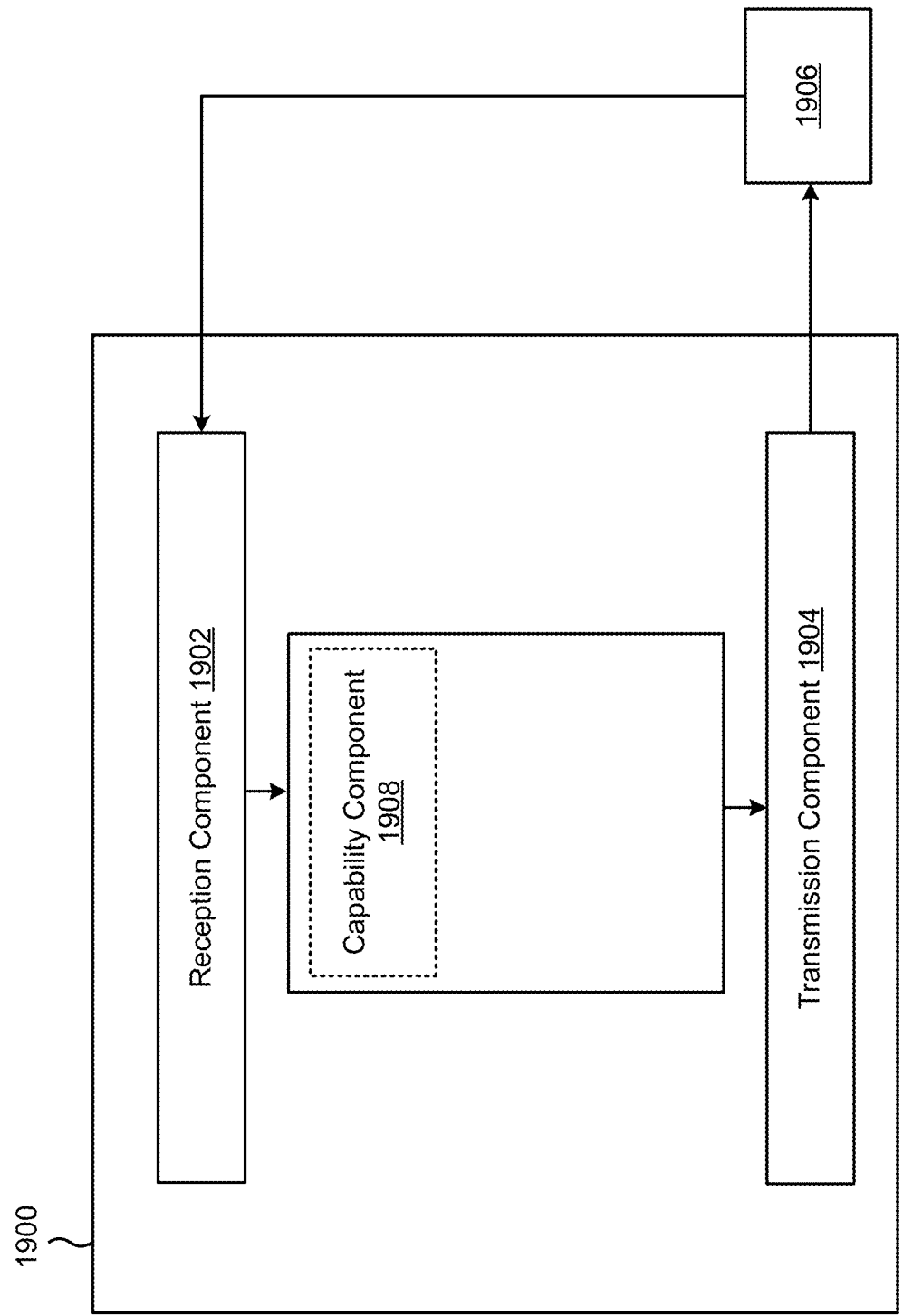

FIG. 19 is a block diagram of an example apparatus 1900 for wireless communication. The apparatus 1900 may be a UE, or a UE may include the apparatus 1900. In some aspects, the apparatus 1900 includes a reception component 1902 and a transmission component 1904, which may be in communication with one another (for example, via one or more buses and/or one or more other components). As shown, the apparatus 1900 may communicate with another apparatus 1906 (such as a UE, a base station, an NTN entity, or another wireless communication device) using the reception component 1902 and the transmission component 1904. As further shown, the apparatus 1900 may include a capability component 1908, among other examples.

In some aspects, the apparatus 1900 may be configured to perform one or more operations described herein in connection with FIGS. 1-10. Additionally, or alternatively, the apparatus 1900 may be configured to perform one or more processes described herein, such as process 1400 of FIG. 14. In some aspects, the apparatus 1900 and/or one or more components shown in FIG. 19 may include one or more components of the UE described above in connection with FIG. 2. Additionally, or alternatively, one or more components shown in FIG. 19 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1902 may receive communications, such as reference signals, control information, data communications, or a combination thereof, from the apparatus 1906. The reception component 1902 may provide received communications to one or more other components of the apparatus 1900. In some aspects, the reception component 1902 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1900. In some aspects, the reception component 1902 may include one or more antennas, a demodulator, a MIMO detector, a receive processor, a controller/processor, a memory, or a combination thereof, of the UE described above in connection with FIG. 2.

The transmission component 1904 may transmit communications, such as reference signals, control information, data communications, or a combination thereof, to the apparatus 1906. In some aspects, one or more other components of the apparatus 1900 may generate communications and may provide the generated communications to the transmission component 1904 for transmission to the apparatus 1906. In some aspects, the transmission component 1904 may perform signal processing on the generated communications (such as filtering, amplification, modulation, digital-to-analog conversion, multiplexing, interleaving, mapping, or encoding, among other examples), and may transmit the processed signals to the apparatus 1906. In some aspects, the transmission component 1904 may include one or more antennas, a modulator, a transmit MIMO processor, a transmit processor, a controller/processor, a memory, or a combination thereof, of the UE described above in connection with FIG. 2. In some aspects, the transmission component 1904 may be co-located with the reception component 1902 in a transceiver.

The capability component 1908 may determine a capability of apparatus 1900. In some aspects, the capability component 1908 may include one or more antennas, a transmit processor, a receive processor, a controller/processor, a memory, or a combination thereof, of the UE described above in connection with FIG. 2. The transmission component 1904 may transmit capability information indicating a capability for switching a polarization of one or more antennas. The reception component 1902 may receive an instruction to switch the polarization of the one or more antennas.

The number and arrangement of components shown in FIG. 19 are provided as an example. In practice, there may be additional components, fewer components, different components, or differently arranged components than those shown in FIG. 19. Furthermore, two or more components shown in FIG. 19 may be implemented within a single component, or a single component shown in FIG. 19 may be implemented as multiple, distributed components. Additionally, or alternatively, a set of (one or more) components shown in FIG. 19 may perform one or more functions described as being performed by another set of components shown in FIG. 19.

Figure 20:
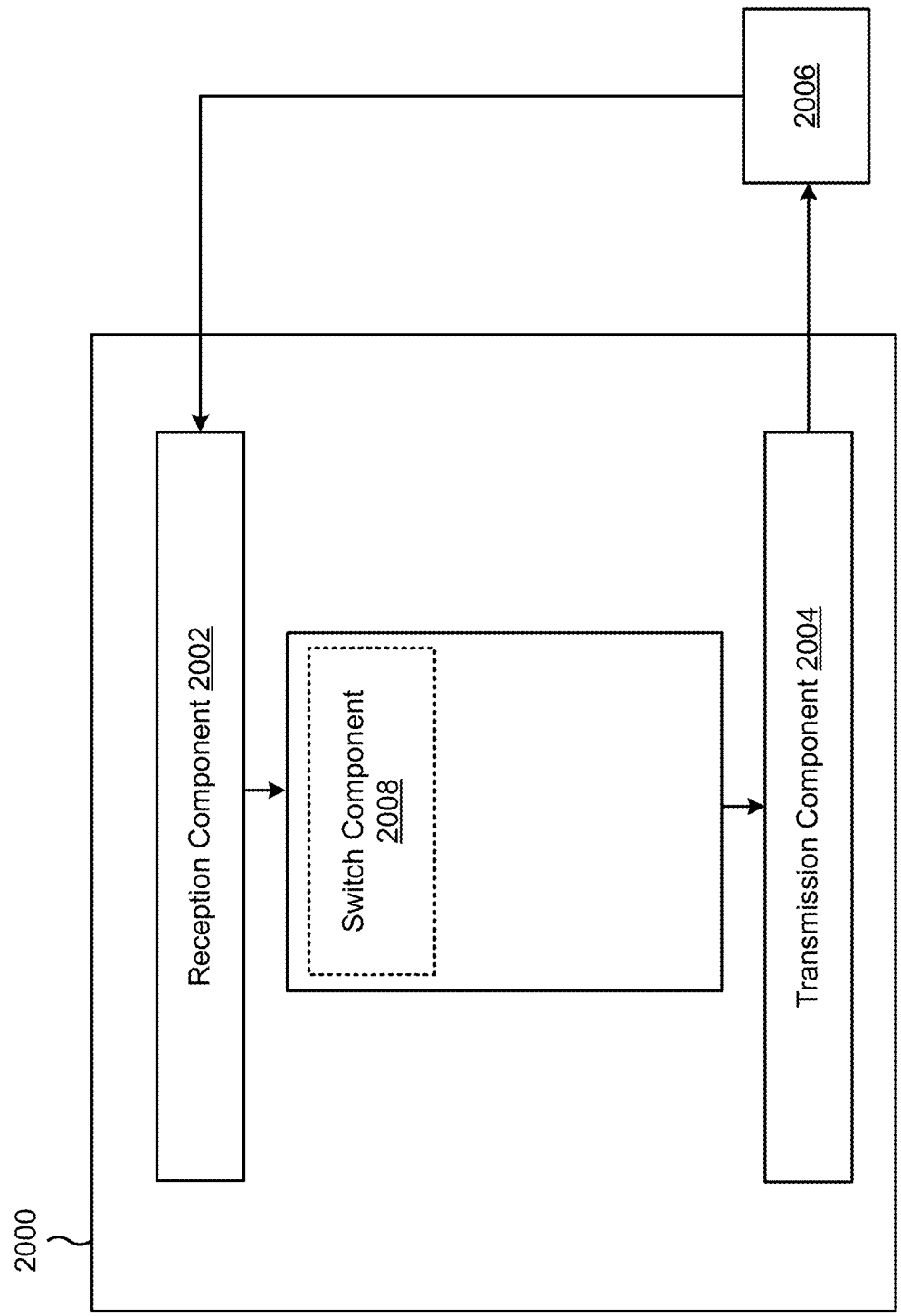

FIG. 20 is a block diagram of an example apparatus 2000 for wireless communication. The apparatus 2000 may be an NTN entity, or an NTN entity may include the apparatus 2000. In some aspects, the apparatus 2000 includes a reception component 2002 and a transmission component 2004, which may be in communication with one another (for example, via one or more buses and/or one or more other components). As shown, the apparatus 2000 may communicate with another apparatus 2006 (such as a UE, a base station, or another wireless communication device) using the reception component 2002 and the transmission component 2004. As further shown, the apparatus 2000 may include a switch component 2008, among other examples.

In some aspects, the apparatus 2000 may be configured to perform one or more operations described herein in connection with FIGS. 1-10. Additionally, or alternatively, the apparatus 2000 may be configured to perform one or more processes described herein, such as process 1500 of FIG. 15. In some aspects, the apparatus 2000 and/or one or more components shown in FIG. 20 may include one or more components of the NTN entity described above in connection with FIGS. 1-3. Additionally, or alternatively, one or more components shown in FIG. 20 may be implemented within one or more components described above in connection with FIGS. 1-3. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 2002 may receive communications, such as reference signals, control information, data communications, or a combination thereof, from the apparatus 2006. The reception component 2002 may provide received communications to one or more other components of the apparatus 2000. In some aspects, the reception component 2002 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 2000. In some aspects, the reception component 2002 may include one or more antennas, a demodulator, a MIMO detector, a receive processor, a controller/processor, a memory, or a combination thereof, of the NTN entity described above in connection with FIGS. 1-3.

The transmission component 2004 may transmit communications, such as reference signals, control information, data communications, or a combination thereof, to the apparatus 2006. In some aspects, one or more other components of the apparatus 2000 may generate communications and may provide the generated communications to the transmission component 2004 for transmission to the apparatus 2006. In some aspects, the transmission component 2004 may perform signal processing on the generated communications (such as filtering, amplification, modulation, digital-to-analog conversion, multiplexing, interleaving, mapping, or encoding, among other examples), and may transmit the processed signals to the apparatus 2006. In some aspects, the transmission component 2004 may include one or more antennas, a modulator, a transmit MIMO processor, a transmit processor, a controller/processor, a memory, or a combination thereof, of the NTN entity described above in connection with FIGS. 1-3. In some aspects, the transmission component 2004 may be co-located with the reception component 2002 in a transceiver.

The reception component 2002 may receive, from a UE, capability information indicating a capability for switching a polarization of one or more antennas.

The switch component 2008 may determine a polarization to which the UE is to switch. In some aspects, the switch component 2008 may include a controller/processor, a memory, or a combination thereof, of the NTN entity described above in connection with FIGS. 1-3. The transmission component 2004 may transmit an instruction to switch the polarization of the one or more antennas based at least in part on the capability information.

The number and arrangement of components shown in FIG. 20 are provided as an example. In practice, there may be additional components, fewer components, different components, or differently arranged components than those shown in FIG. 20. Furthermore, two or more components shown in FIG. 20 may be implemented within a single component, or a single component shown in FIG. 20 may be implemented as multiple, distributed components. Additionally, or alternatively, a set of (one or more) components shown in FIG. 20 may perform one or more functions described as being performed by another set of components shown in FIG. 20.

The following provides an overview of some Aspects of the present disclosure:

Aspect 1: A method of wireless communication performed by a user equipment (UE), comprising: determining a duration of a first gap that precedes a reference signal based at least in part on a polarization of the reference signal; determining a duration of a second gap that succeeds the reference signal based at least in part on the polarization of the reference signal; and performing a measurement of the reference signal based at least in part on the first gap and the second gap.

Aspect 2: The method of Aspect 1, wherein performing the measurement of the reference signal includes switching, during the first gap, an antenna configuration to the polarization of the reference signal from a different polarization, and reverting, during the second gap, the antenna configuration to the different polarization.

Aspect 3: The method of Aspect 2, wherein determining the duration of the first gap includes determining the duration of the first gap based at least in part on a difference between the polarization of the reference signal and the different polarization.

Aspect 4: The method of Aspect 2 or 3, wherein determining the duration of the second gap includes determining the duration of the second gap based at least in part on a difference between the polarization of the reference signal and the different polarization.

Aspect 5: The method of any of Aspects 1-4, wherein determining the duration of the first gap includes determining the duration of the first gap based at least in part on one or more of a bandwidth part for the reference signal or a bandwidth part used before the first gap.

Aspect 6: The method of Aspect 5, wherein the bandwidth part for the reference signal and the bandwidth part used before the first gap are the same bandwidth part.

Aspect 7: The method of Aspect 5, wherein the bandwidth part for the reference signal is different than the bandwidth part used before the first gap.

Aspect 8: The method of any of Aspects 1-7, wherein determining the duration of the second gap includes determining the duration of the second gap based at least in part on one or more of a bandwidth part for the reference signal or a bandwidth part used before the first gap.

Aspect 9: The method of any of Aspects 1-8, wherein determining the duration of the first gap includes determining the duration of the first gap based at least in part on one or more of a spatial relation for the reference signal or a spatial relation used before the first gap.

Aspect 10: The method of any of Aspects 1-9, wherein determining the duration of the second gap includes determining the duration of the second gap based at least in part on one or more of a spatial relation for the reference signal or a spatial relation used before the first gap.

Aspect 11: The method of any of Aspects 1-10, wherein performing the measurement of the reference signal includes determining one or more of a layer 3 reference signal received power (RSRP) or a layer 1 RSRP of the reference signal.

Aspect 12: The method of any of Aspects 1-11, wherein the reference signal is one of a channel state information (CSI) reference signal or a CSI interference measurement resource.

Aspect 13: The method of Aspect 12, wherein the CSI interference measurement resource is beam specific, wherein a beam is identified by one or more of an SSB index, a physical cell identity, or a satellite beam identity.

Aspect 14: The method of Aspect 13, further comprising measuring interference, in an indicated polarization, from one or more beams.

Aspect 15: A method of wireless communication performed by a user equipment (UE), comprising: receiving configuration information indicating a polarization of a reference signal; receiving the reference signal with the indicated polarization; and performing a measurement of the reference signal with the indicated polarization.

Aspect 16: The method of Aspect 15, wherein receiving the reference signal includes receiving the reference signal in a channel state information interference measurement resource.

Aspect 17: The method of Aspect 15 or 16, wherein performing the measurement of the reference signal includes performing the measurement of the reference signal in a beam among a plurality of beams with a same polarization as the indicated polarization.

Aspect 18: The method of Aspect 15 or 16, wherein performing the measurement of the reference signal includes performing the measurement of the reference signal in a beam among a plurality of beams with different polarizations than the indicated polarization.

Aspect 19: The method of Aspect 18, wherein a beam is identified by one or more of an SSB index, a satellite beam index, or a physical cell identity.

Aspect 20: A method of wireless communication performed by a non-terrestrial network entity, comprising: determining a polarization of a reference signal; transmitting configuration information indicating the polarization of the reference signal; and transmitting the reference signal with the polarization.

Aspect 21: The method of Aspect 20, wherein transmitting the reference signal includes transmitting the reference signal in a channel state information interference measurement resource.

Aspect 22: The method of Aspect 20 or 21, wherein transmitting the reference signal includes transmitting a zero-power signal for a plurality of UEs being served by a serving beam.

Aspect 23: The method of Aspect 20 or 21, wherein transmitting the reference signal includes transmitting a non-zero power signal in a channel state information interference measurement resource on one or more other beams.

Aspect 24: The method of any of Aspects 20-23, wherein a beam is identified by one or more of an SSB index, a satellite beam index, or a physical cell identity.

Aspect 25: A method of wireless communication performed by a user equipment (UE), comprising: transmitting capability information indicating a capability for switching a polarization of one or more antennas; and receiving an instruction to switch the polarization of the one or more antennas.

Aspect 26: The method of Aspect 25, wherein the capability information indicates a capability for switching the polarization per antenna of the one or more antennas.

Aspect 27: The method of Aspect 25 or 26, wherein the capability information indicates a time for switching the polarization of the one or more antennas.

Aspect 28: The method of any of Aspects 25-27, wherein the capability information indicates one or more types of polarization switching.

Aspect 29: The method of any of Aspects 25-28, wherein the capability information indicates that the UE is not capable of switching the polarization of the one or more antennas, and wherein the capability information indicates the polarization of the one or more antennas.

Aspect 30: A method of wireless communication performed by a non-terrestrial network entity, comprising: receiving, from a user equipment (UE), capability information indicating a capability for switching a polarization of one or more antennas; and transmitting an instruction to switch the polarization of the one or more antennas based at least in part on the capability information.

Aspect 31: The method of Aspect 30, wherein the capability information indicates a capability for switching the polarization per antenna of the one or more antennas.

Aspect 32: The method of Aspect 30 or 31, wherein the capability information indicates a time for switching the polarization of the one or more antennas.

Aspect 33: The method of any of Aspects 30-32, wherein the capability information indicates one or more types of polarization switching.

Aspect 34: The method of Aspect 30, wherein the capability information indicates that the UE is not capable of switching the polarization of the one or more antennas, and wherein the capability information indicates the polarization of the one or more antennas.

Aspect 35: An apparatus for wireless communication at a device, comprising a processor; memory coupled with the processor; and instructions stored in the memory and executable by the processor to cause the apparatus to perform the method of one or more of Aspects 1-34.

Aspect 36: A device for wireless communication, comprising a memory and one or more processors coupled to the memory, the one or more processors configured to perform the method of one or more of Aspects 1-34.

Aspect 37: An apparatus for wireless communication, comprising at least one means for performing the method of one or more of Aspects 1-34.

Aspect 38: A non-transitory computer-readable medium storing code for wireless communication, the code comprising instructions executable by a processor to perform the method of one or more of Aspects 1-34.

Aspect 39: A non-transitory computer-readable medium storing a set of instructions for wireless communication, the set of instructions comprising one or more instructions that, when executed by one or more processors of a device, cause the device to perform the method of one or more of Aspects 1-34.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term "component" is intended to be broadly construed as hardware, firmware, and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a processor is implemented in hardware, firmware, and/or a combination of hardware and software.

It will be apparent that systems and/or methods described herein may be implemented in different forms of hardware, firmware, and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, a combination of related and unrelated items), and may be used interchangeably with "one or more." Where only one item is intended, the phrase "only one" or similar language is used. Also, as used herein, the terms "has," "have," "having," and/or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. An apparatus for wireless communication at a user equipment (UE), comprising:
one or more memories; and
one or more processors, coupled to the one or more memories, which are configured, individually or in any combination, to:
receive configuration information indicating a polarization of a reference signal;
receive the reference signal with the indicated polarization, wherein a measurement gap precedes the reference signal and a duration of the measurement gap is based at least in part on the indicated polarization; and perform a measurement of the reference signal with the indicated polarization.

2. The apparatus of claim 1, wherein the one or more processors, to receive the reference signal, are configured to receive the reference signal in a channel state information interference measurement resource.

3. The apparatus of claim 1, wherein the one or more processors, to perform the measurement of the reference signal, are configured to perform the measurement of the reference signal in a beam among a plurality of beams with a same polarization as the indicated polarization.

4. The apparatus of claim 1, wherein the one or more processors, to perform the measurement of the reference signal, are configured to perform the measurement of the reference signal in a beam among a plurality of beams with different polarizations than the indicated polarization.

5. The apparatus of claim 4, wherein the beam is identified by one or more of a synchronization signal block (SSB) index, a satellite beam index, or a physical cell identity.

6. An apparatus for wireless communication at a non-terrestrial network entity, comprising:
one or more memories; and
one or more processors, coupled to the one or more memories, which are configured, individually or in any combination, to:
determine a polarization of a reference signal;
transmit configuration information indicating the polarization of the reference signal; and
transmit the reference signal with the polarization, wherein a measurement gap precedes the reference signal and a duration of the measurement gap is based at least in part on the polarization.

7. The apparatus of claim 6, wherein the one or more processors, to transmit the reference signal, are configured to transmit the reference signal in a channel state information interference measurement resource.

8. The apparatus of claim 6, wherein the one or more processors, to transmit the reference signal, are configured to transmit a zero-power signal for a plurality of user equipments (UEs) being served by a serving beam.

9. The apparatus of claim 8, wherein the one or more processors, to transmit the reference signal, are configured to transmit a non-zero power signal in a channel state information interference measurement resource on one or more other beams.

10. The apparatus of claim 8, wherein a beam is identified by one or more of a synchronization signal block (SSB) index, a satellite beam index, or a physical cell identity.

11. The apparatus of claim 6, wherein the one or more processors are configured to:
receive, from a user equipment (UE), capability information indicating a capability for switching a polarization of one or more antennas; and
transmit an instruction to switch the polarization of the one or more antennas based at least in part on the capability information.

12. A method of wireless communication performed by a user equipment (UE), comprising:
receiving configuration information indicating a polarization of a reference signal;
receiving the reference signal with the indicated polarization, wherein a measurement gap precedes the reference signal and a duration of the measurement gap is based at least in part on the indicated polarization; and
performing a measurement of the reference signal with the indicated polarization.

13. The method of claim 12, wherein receiving the reference signal comprises receiving the reference signal in a channel state information interference measurement resource.

14. The method of claim 12, wherein performing the measurement of the reference signal comprises performing the measurement of the reference signal in a beam among a plurality of beams with a same polarization as the indicated polarization.

15. The method of claim 12, wherein performing the measurement of the reference signal comprises performing the measurement of the reference signal in a beam among a plurality of beams with different polarizations than the indicated polarization.

16. The method of claim 15, wherein the beam is identified by one or more of a synchronization signal block (SSB) index, a satellite beam index, or a physical cell identity.

17. A method of wireless communication performed by a user equipment (UE), comprising:
determining a polarization of a reference signal;
transmitting configuration information indicating the polarization of the reference signal; and
transmitting the reference signal with the polarization, wherein a measurement gap precedes the reference signal and a duration of the measurement gap is based at least in part on the polarization.

18. The method of claim 17, wherein transmitting the reference signal comprises transmitting the reference signal in a channel state information interference measurement resource.

19. The method of claim 17, wherein transmitting the reference signal comprises transmitting a zero-power signal for a plurality of user equipments (UEs) being served by a serving beam.

20. The method of claim 19, wherein transmitting the reference signal comprises transmitting a non-zero power signal in a channel state information interference measurement resource on one or more other beams.

21. The method of claim 19, wherein a beam is identified by one or more of a synchronization signal block (SSB) index, a satellite beam index, or a physical cell identity.

22. The method of claim 17, comprising:
receiving capability information indicating a capability for switching a polarization of one or more antennas; and
transmitting an instruction to switch the polarization of the one or more antennas based at least in part on the capability information.

23. A non-transitory computer-readable medium storing a set of instructions for wireless communication, the set of instructions comprising:
one or more instructions that, when executed by one or more processors of a user equipment (UE), cause the UE to:
receive configuration information indicating a polarization of a reference signal;
receive the reference signal with the indicated polarization, wherein a measurement gap precedes the reference signal and a duration of the measurement gap is based at least in part on the indicated polarization; and
perform a measurement of the reference signal with the indicated polarization.

24. The non-transitory computer-readable medium of claim 23, wherein the one or more instructions, that cause the UE to receive the reference signal, cause the UE to receive the reference signal in a channel state information interference measurement resource.

25. The non-transitory computer-readable medium of claim 23, wherein the one or more instructions, that cause the UE to perform the measurement of the reference signal, cause the UE to perform the measurement of the reference signal in a beam among a plurality of beams with a same polarization as the indicated polarization.

26. The non-transitory computer-readable medium of claim 23, wherein the one or more instructions, that cause the UE to perform the measurement of the reference signal, cause the UE to perform the measurement of the reference signal in a beam among a plurality of beams with different polarizations than the indicated polarization.

27. The non-transitory computer-readable medium of claim 26, wherein the beam is identified by one or more of a synchronization signal block (SSB) index, a satellite beam index, or a physical cell identity.

28. A non-transitory computer-readable medium storing a set of instructions for wireless communication, the set of instructions comprising:
one or more instructions that, when executed by one or more processors of a non-terrestrial network entity, cause the non-terrestrial network entity to:
determine a polarization of a reference signal;
transmit configuration information indicating the polarization of the reference signal; and
transmit the reference signal with the polarization, wherein a measurement gap precedes the reference signal and a duration of the measurement gap is based at least in part on the polarization.

29. The non-transitory computer-readable medium of claim 28, wherein the one or more instructions, that cause the non-terrestrial network entity to transmit the reference signal, cause the non-terrestrial network entity to transmit the reference signal in a channel state information interference measurement resource.

30. The non-transitory computer-readable medium of claim 28, wherein the one or more instructions, that cause the non-terrestrial network entity to transmit the reference signal, cause the non-terrestrial network entity to transmit a zero-power signal for a plurality of user equipments (UEs) being served by a serving beam.

* * * * *